United States Patent
Tamura

(10) Patent No.: US 9,941,762 B2
(45) Date of Patent: Apr. 10, 2018

(54) STATOR OF ROTATING ELECTRIC MACHINE

(71) Applicant: DENSO CORPORATION, Kariya, Aichi-pref. (JP)

(72) Inventor: Akito Tamura, Anjo (JP)

(73) Assignee: DENSO CORPORATION, Kariya (JP)

( * ) Notice: Subject to any disclaimer, the term of this patent is extended or adjusted under 35 U.S.C. 154(b) by 440 days.

(21) Appl. No.: 14/801,957

(22) Filed: Jul. 17, 2015

(65) Prior Publication Data

US 2016/0020658 A1    Jan. 21, 2016

(30) Foreign Application Priority Data

Jul. 18, 2014 (JP) .................................. 2014-148086
Jul. 18, 2014 (JP) .................................. 2014-148088
Jul. 18, 2014 (JP) .................................. 2014-148105

(51) Int. Cl.
| | | |
|---|---|---|
| *H02K 9/19* | (2006.01) | |
| *H02K 3/28* | (2006.01) | |
| *H02K 3/12* | (2006.01) | |
| *H02K 3/50* | (2006.01) | |
| *H02K 9/22* | (2006.01) | |

(52) U.S. Cl.
CPC .................. *H02K 3/28* (2013.01); *H02K 3/12* (2013.01); *H02K 3/50* (2013.01); *H02K 9/19* (2013.01); *H02K 9/22* (2013.01); *H02K 2203/09* (2013.01); *H02K 2213/03* (2013.01)

(58) Field of Classification Search
CPC .. H02K 3/50; H02K 3/28; H02K 9/19; H02K 9/22

USPC .......................................... 310/71, 54, 58, 64
See application file for complete search history.

(56) References Cited

U.S. PATENT DOCUMENTS

| | | | | |
|---|---|---|---|---|
| 6,358,352 | B1 * | 3/2002 | Schmidt .................... | B07C 5/14 |
| | | | | 144/344 |
| 6,894,410 | B2 * | 5/2005 | Kobayashi ......... | H02K 15/0056 |
| | | | | 310/239 |
| 7,909,130 | B2 * | 3/2011 | Morikawa ............ | B62D 5/0406 |
| | | | | 180/443 |

(Continued)

FOREIGN PATENT DOCUMENTS

| | | |
|---|---|---|
| JP | 2005-012961 A | 1/2005 |
| JP | 2007-202263 A | 8/2007 |

(Continued)

*Primary Examiner* — Terrance Kenerly
(74) *Attorney, Agent, or Firm* — Oliff PLC

(57) ABSTRACT

In a stator of a rotating electric machine, an annular stator core has slots. A stator winding includes phase windings of three phases of differing electrical phases that are housed in the slots and wound around the stator core. Three phase bus bars electrically connect the respective phase windings to an external apparatus. Each of the phase windings are configured by multiple parallel windings. The phase bus bars are integrated with a fixing member to form a bus bar module. Each of the phase bus bars include branch portions and a trunk portion. The branch portions are electrically connected to the respective phase windings. The trunk portion electrically connects together the branch portions, and is configured that a cross-sectional area of an end portion closest to the phase winding is smaller than a cross-sectional area of an end portion closest to the external apparatus.

20 Claims, 35 Drawing Sheets

(56) References Cited

U.S. PATENT DOCUMENTS

| | | | | |
|---|---|---|---|---|
| 7,948,143 | B2* | 5/2011 | Nakamura | H02K 15/0037 |
| | | | | 310/201 |
| 8,482,172 | B2* | 7/2013 | Sasaki | H02K 3/522 |
| | | | | 310/180 |
| 2010/0000075 | A1* | 1/2010 | Akimoto | H02K 15/024 |
| | | | | 29/596 |
| 2012/0062051 | A1* | 3/2012 | Ueno | H02K 1/148 |
| | | | | 310/43 |
| 2013/0076188 | A1 | 3/2013 | Ikeda et al. | |
| 2013/0257200 | A1 | 10/2013 | Nakayama et al. | |

FOREIGN PATENT DOCUMENTS

| | | |
|---|---|---|
| JP | 2008-312324 A | 12/2008 |
| JP | 2013-211945 A | 10/2013 |

* cited by examiner

FIG.29
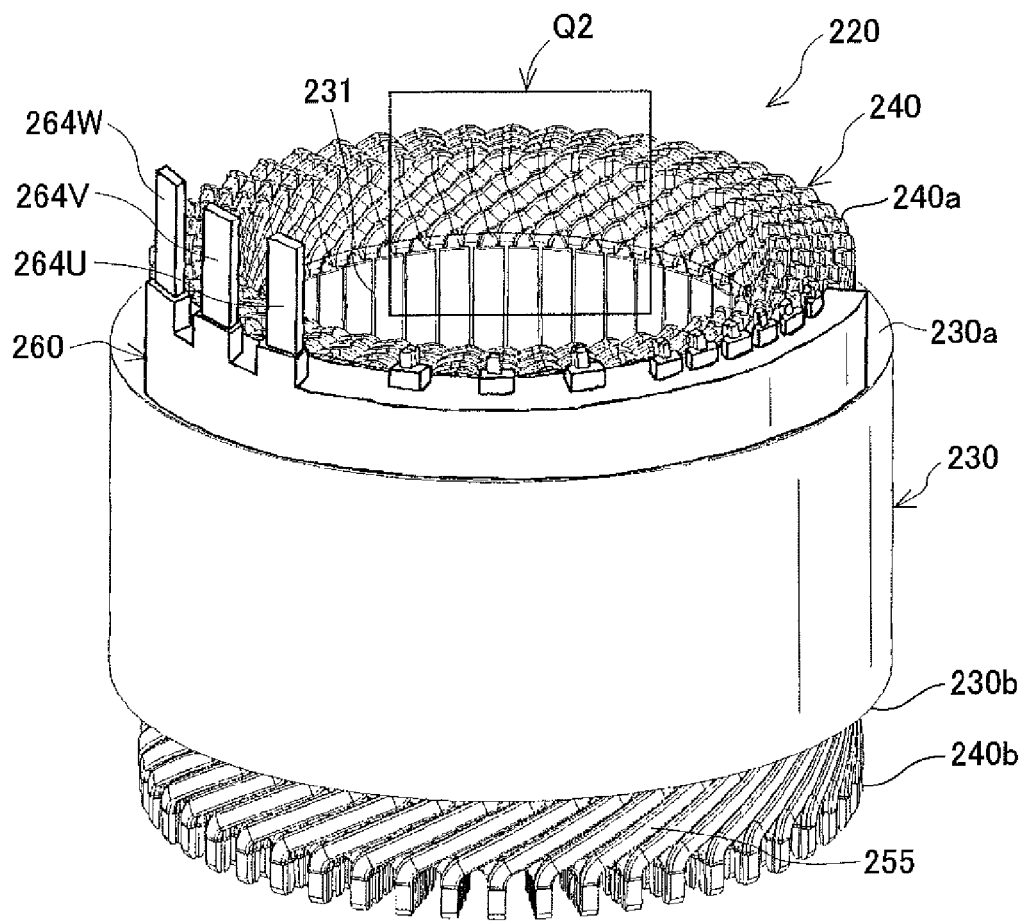
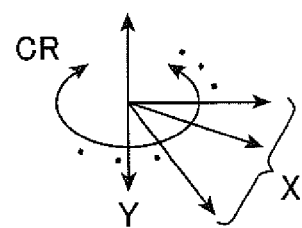

STATOR OF ROTATING ELECTRIC MACHINE

CROSS-REFERENCE TO RELATED APPLICATION

This application is based on and claims the benefit of priority from Japanese Patent Application Nos. 2014-148086, filed Jul. 18, 2014, 2014-148088, filed Jul. 18, 2014, and 2014-148105, filed Jul. 18, 2014. The entire disclosures of each of the above applications are incorporated herein by reference.

BACKGROUND

Technical Field

The present disclosure relates to a stator of a rotating electric machine that is mounted in a vehicle or the like, and used as an electric motor or a power generator.

Related Art

As a rotating electric machine that is used so as to be mounted in a vehicle, a rotating electric machine that includes a rotor provided in a rotatable manner, and a stator having a stator core and a stator winding is commonly known. In this rotating electric machine, the stator core is disposed so as to oppose the rotor in a radial direction and has a plurality of slots that are arrayed in a circumferential direction, and the stator winding is composed of a plurality of phase windings that are wound around the slots in the stator core.

The stator core is ordinarily formed by a plurality of steel plates that are laminated in an axial direction to prevent generation of eddy currents. In addition, JP-A-2013-211945 discloses a motor (electric motor) that includes a bus bar, that connects the plurality of phase windings that are wound around the slots of the stator core.

As the stator winding, for example, a segment type is known in which the stator winding is wound around the stator core by open end portions of U-shaped conductor segments being inserted into the slots of the stator core, and the ends of predetermined open end portions extending from differing slots being connected to each other on one end side of the stator core.

In addition, JP-A-2005-12961 discloses that a guiding groove is provided on the outer circumferential surface of a coil end portion of the stator winding that projects outward from an axial direction end surface of the stator core, to guide a cooling liquid supplied from the coil end portion.

The bus bar disclosed in above-mentioned JP-A-2013-211945 may become damaged as a result of stress attributed to temperature difference caused by the difference in density of the current flowing through the bus bar.

In addition, when the bus bar is attached to the stator core, as shown in FIG. 27, the bus bar is attached by metal attachment pins 1167 provided in the bus bar being pressed in an axial direction into attachment holes 1135 provided in a plurality of areas on one axial-direction end surface of a stator core 1130. However, when the attachment pins 1167 are pressed into the attachment holes 1135 in the stator core 130, the steel plates of the stator core 1130 that are laminated in the axial direction conduct current amongst one another via the attachment pins 1167. As a result, eddy currents that pass through the attachment pins 1167 are generated, and loss increases.

In addition, as a winding method for the stator winding that is wound around the stator core, "distributed winding" in which the winding is not concentrated at a single slot, but rather distributed among a plurality of slots is known. In the stator winding that is wound around the stator core by distributed winding, in particular, phase windings of differing phases that have a large potential difference are near each other at the coil end portion. Therefore, when the insulation capability of an insulating film that covers the outer circumferential surface of a conductor line decreases as a result of abnormal heat generation or thermal degradation, insulation defects may occur.

Therefore, it is desired to provide a stator of a rotating electric machine that is capable of suppressing differences in current density within the bus bar and reducing stress attributed to temperature difference.

In addition, it is desired to provide a stator of a rotating electric machine that is capable of suppressing generation of eddy currents that flow through the attachment pins of the bus bar that are pressed into the attachment holes in the stator core, and suppressing increase in loss.

In addition, it is desired to provide a stator of a rotating electric machine that is capable of preventing temperature rise in the stator winding and preventing the occurrence of insulation defects.

SUMMARY

A first exemplary embodiment provides a stator of a rotating electric machine including: an annular stator core that has a plurality of slots including U-phase slots, V-phase slots, and W-phase slots that are sequentially and repeatedly arranged in a circumferential direction; a stator winding that includes phase windings of three phases (U-phase, V-phase, W-phase) of differing electrical phases that are housed in the slots and wound around the stator core; and three phase bus bars that electrically connect the respective phase windings to an external apparatus. Each of the phase windings are configured by a plurality of parallel windings, each of which are connected in parallel. The phase bus bars are integrated with a fixing member to form a bus bar module, and each of the phase bus bars include a plurality of branch portions that are electrically connected to the respective phase windings, and a trunk portion that electrically connects together the branch portions. The trunk portion is configured such that a cross-sectional area of an end portion closest to the phase winding is smaller than a cross-sectional area of an end portion closest to the external apparatus.

In the first exemplary embodiment, the trunk portion of each of the phase bus bars is configured such that the cross-sectional area of the end portion on the phase winding side is smaller than the cross-sectional area of the end portion on the external apparatus side. Therefore, the difference in density of the current flowing through the trunk portion of each phase bus bar between the two end portions of the trunk portion is reduced, thereby enabling reduction in stress attributed to temperature difference.

A second exemplary embodiment provides a stator of a rotating electric machine including: a stator core that is formed by a plurality of annular steel plates being laminated in an axial direction of the rotating electric machine, and has a plurality of slots including U-phase slots, V-phase slots, and W-phase slots that are sequentially and repeatedly arranged in quantity n at a time in a circumferential direction of the rotating electric machine; a stator winding that includes phase windings of three phases (U-phase, V-phase, W-phase) of differing electrical phases that are housed in the slots and wound around the stator core; and a bus bar module that has three phase bus bars that are electrically connected to the respective phase windings, and a plurality of attachment pins that are respectively pressed into a plurality of attachment holes that are provided on one axial end surface of the stator core so as to be separated in the circumferential direction, the bus bar module being integrated with a fixing member. When an angle formed by two slots that are adjacent to each other in the circumferential direction around an axial line of the stator core is θs, an angle θh formed by two attachment holes that are adjacent to each other in the circumferential direction around the axial line is determined by θh≈m (m being a positive integer)×6××θs.

In the second exemplary embodiment, a bus bar module is included that has three phase bus bars that are electrically connected to the respective phase windings and a plurality of attachment pins that are respectively pressed into a plurality of attachment holes that are provided on one axial-end surface of the stator core so as to be separated in the circumferential direction. The bus bar module is integrated with a fixing member. When the an angle formed by two slots that are adjacent to each other in the circumferential direction around an axial line (0) of the stator core is θs, an angle θh formed by two attachment holes that are adjacent to each other in the circumferential direction around the axial line is determined by θh≈m×6×n×θs. In other words, in the present disclosure, as a result of the pitch of two attachment holes adjacent to each other in the circumferential direction being set to an integral multiple of the pitch of a magnetic pole pair, changes in magnetic flux within a loop formed via the attachment pins of the bus bar module pressed into the attachment hole of the stator core can be eliminated. As a result, generation of eddy currents can be suppressed and increase in loss can be suppressed A third exemplary embodiment provides a stator of a rotating electric machine including: a stator core that has a plurality of slots that are arrayed in a circumferential direction of the rotating electric machine; and a stator winding that includes phase windings of three phases (U-phase, V-phase, W-phase) of differing electrical phases that are wound around the stator core by open end portions of conductor segments being inserted into the slots, the open end portions extending outward in an axial direction of the rotating electric machine from differing slots being twisted in the circumferential direction, and terminals of predetermined open end portions thereafter being connected to one another on one end side of the stator core. The conductor segment has a conductor that has a rectangular cross-section, and an insulating film that covers the outer peripheral surface of the conductor. The phase windings are configured such that respective planar outer peripheral surfaces oppose those of other phase windings having differing electrical phases on at least one end side in the axial direction of the stator core, and are each composed of a plurality of parallel windings, each of which are connected in parallel. End portions of the phase windings are respectively electrically connected to heat releasing members that have conductivity.

In the third invention, the phase windings are configured such that respective planar outer peripheral surfaces oppose those of other phase windings having differing electrical phases on at least one end side in the axial direction of the stator core, and are each composed of a plurality of parallel windings, each of which are connected in parallel. The end portions of the phase windings are respectively electrically connected to heat releasing members that have conductivity. Therefore, when the stator winding generates heat as a result of being energized, the heat releasing members can draw the heat from the phase windings and release the heat outside, thereby lowering the temperature of the phase windings. As a result, the occurrence of insulation defects caused by thermal degradation and abnormal heat generation in the insulating films of the conductor segments configuring the phase windings can be prevented.

In addition, each of the phase windings include a plurality of parallel windings, each of which are connected in parallel. Therefore, surface areas of the phase windings can be increased and heat releasability can be improved, thereby enabling the occurrence of insulation defects to be prevented with further certainty.

The reference numbers within the parentheses following the components and parts described in this section and recited in the claims indicate correlations to specific components and parts described according to embodiments, described hereafter, and do not affect in any way the configurations in the claims.

BRIEF DESCRIPTION OF THE DRAWINGS

In the accompanying drawings:

FIG. 29 is an overall perspective view of the stator according to the fourth embodiment;

DESCRIPTION OF EMBODIMENTS

Embodiments of a stator of a rotating electric machine of the present disclosure will hereinafter be described in detail with reference to the drawings.

First Embodiment

Figure 1:
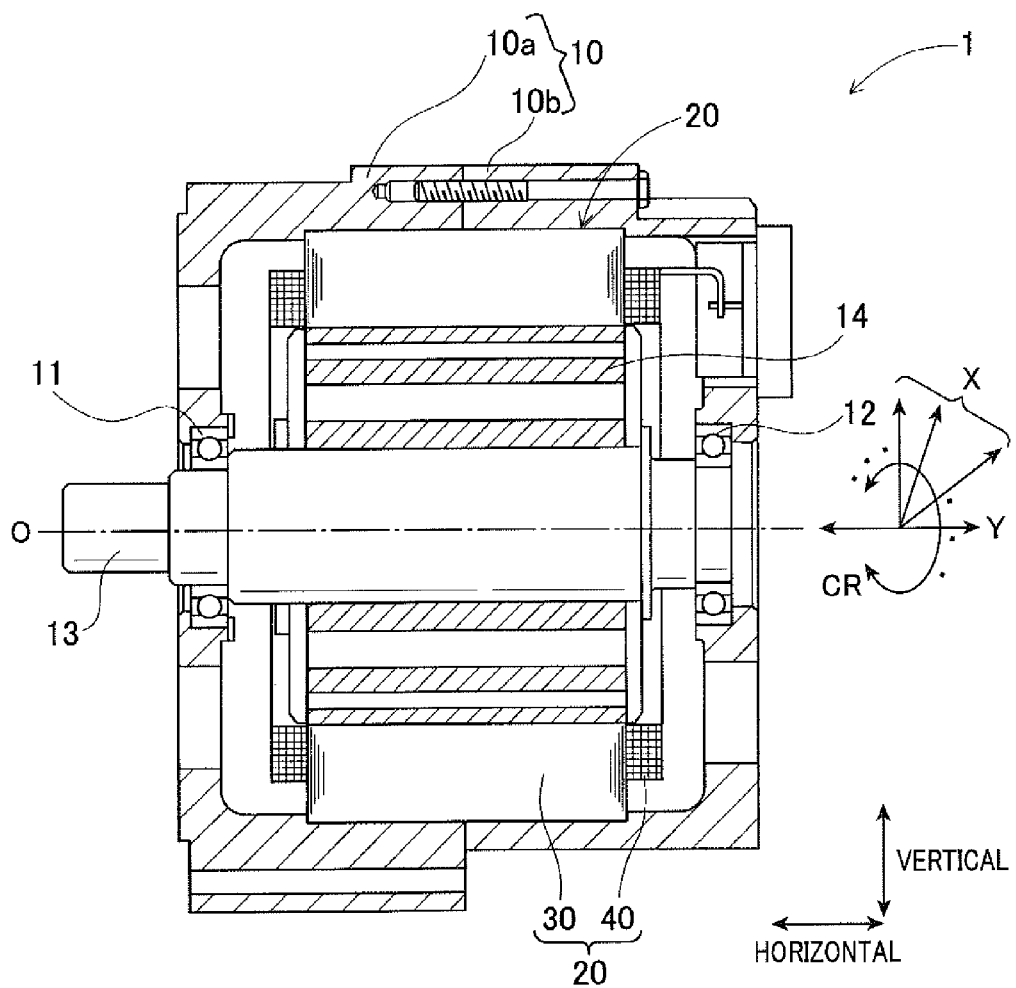
FIG. 1 is an axial-direction cross-sectional view of a rotating electric machine in which a stator is mounted according to a first embodiment.

FIG. 1 shows a rotating electric machine 1 in which a stator 20 according to the present embodiment is mounted. This rotating electric machine 1 is used as an electric motor for a vehicle. As shown in FIG. 1, the rotating electric machine 1 includes a housing 10 that is composed by a pair of bottomed tube-shaped housing members 10a and 10b being joined together at respective opening portions, a rotating shaft 13 that is supported so as to rotate freely in the housing 10 by bearings 11 and 12, a rotor 14 that is fitted onto the outer circumference of the rotating shaft 13 and fixed thereto, and a stator 20 that is disposed so as to oppose the rotor 14 in a radial direction X of the rotating electric machine 1 on the outer side of the rotor 14.

The rotor 14 has a plurality of magnetic poles disposed on the outer circumferential side opposing the inner circumferential side of the stator 20 in the radial direction X, so as to be spaced apart by a predetermined distance in the circumferential direction and such that the polarities alternately differ in the circumferential direction. These magnetic poles are formed by a plurality of permanent magnets that are embedded in predetermined positions in the rotor 14. The number of magnetic poles in the rotor 14 is not limited because the quantity differs depending on rotating electric machine. According to the present embodiment, a rotor having eight poles (four N poles and four S poles) is used.

Figure 2:
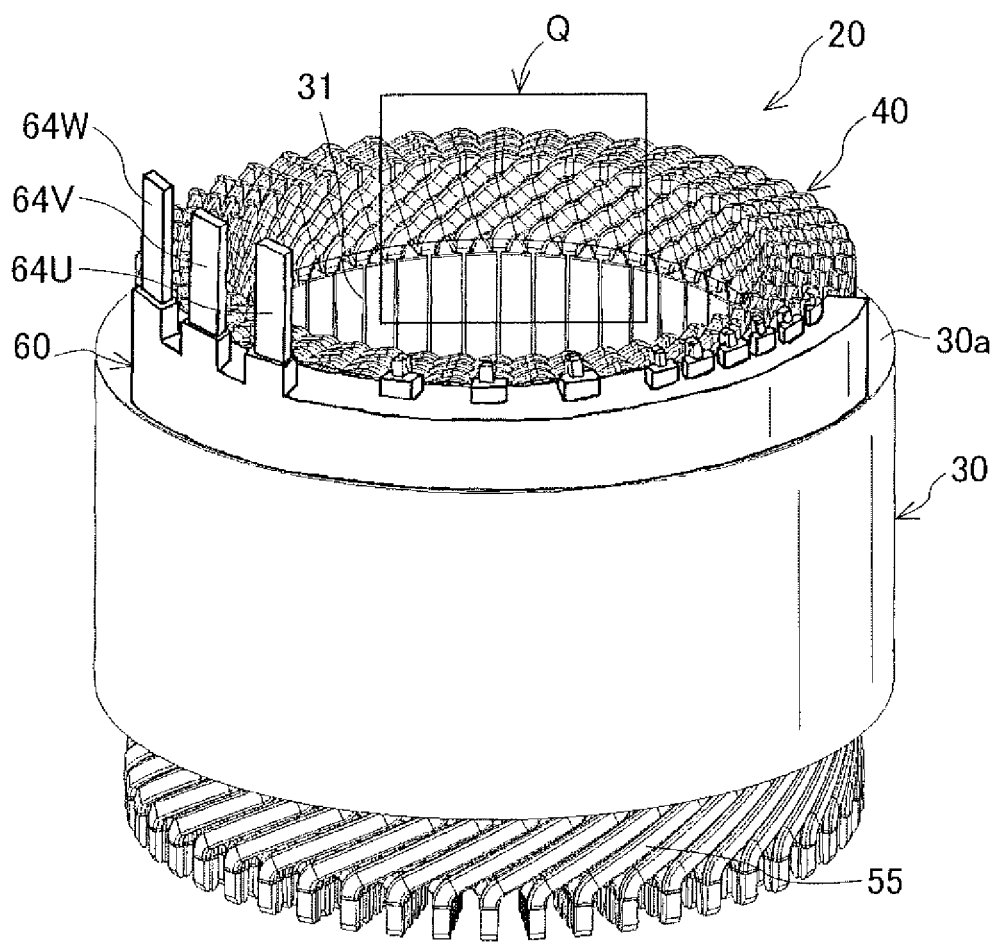
FIG. 2 is an overall perspective view of the stator according to the first embodiment.
Figure 3:
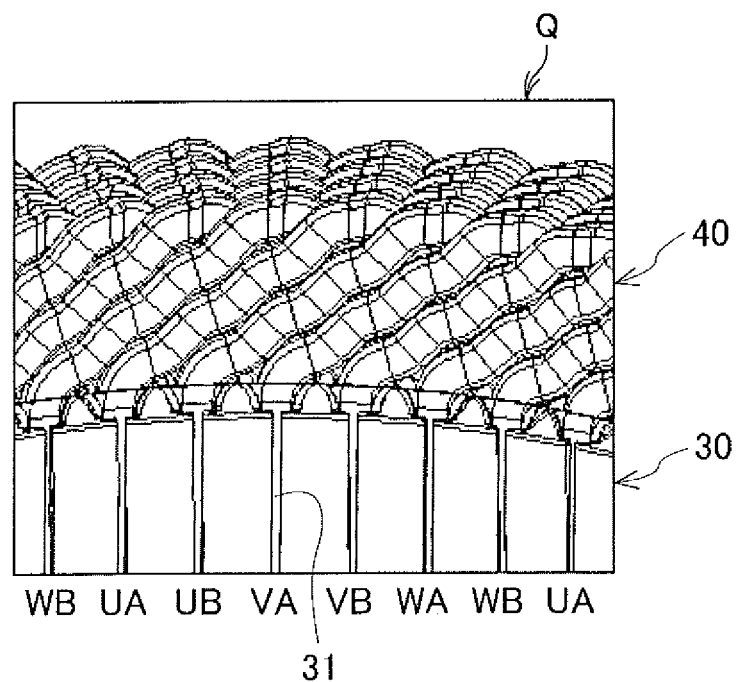
FIG. 3 is an enlarged view of section Q in FIG. 2.

Next, the stator 20 will be described with reference to FIG. 2 to FIG. 8. As shown in FIG. 2 and FIG. 3, the stator 20 includes an annular stator core 30 that has a plurality of slots 31 in the circumferential direction, a stator winding 40 composed of phase windings 41U, 41V, and 41W of three phases (U-phase, V-phase, and W-phase) of differing electrical phases that are wound around the slots 31 of the stator core 30, and a bus bar module 60 that is attached to the stator core 30 and has three phase bus bars 61U, 61V, and 61W that electrically connect the respective phase windings 41U, 41V, and 41W to an external apparatus (not shown).

The stator core 30 is an integrated type that is formed by a plurality of annular electromagnetic steel plates being laminated in an axial direction Y of the stator core 30. The stator core 30 is composed of an annular back core 33 and a plurality of teeth 34 that project from the back core 33 towards the inward radial direction and are arrayed so as to be spaced apart by a predetermined distance in the circumferential direction. Each slot 31 is formed between adjacent teeth 34 (see FIG. 4). The number of slots 31 formed in the stator core 30 is set such that two slots 31 are formed for each phase of the winding 40, for each magnetic pole (eight poles) of the rotor 14. In the present embodiment, based on 8×3×2=48, 48 slots are provided. In other words, the 48 slots 31 are composed of U-phase slots UA and UB, V-phase slots VA and VB, and W-phase slots WA and WB that are sequentially and repeatedly arranged in twos in the circumferential direction (see FIG. 3).

The stator winding 40 is configured by a plurality of U-shaped conductor segments 50 being joined together by welding at the end portions on the open end side. The conductor segment 50 is formed by a flat (rectangular) conducting wire, composed of a conductor having a rectangular cross-section and an insulating film that covers the outer peripheral surface of the conductor, being bent into a U shape.

Figure 4:
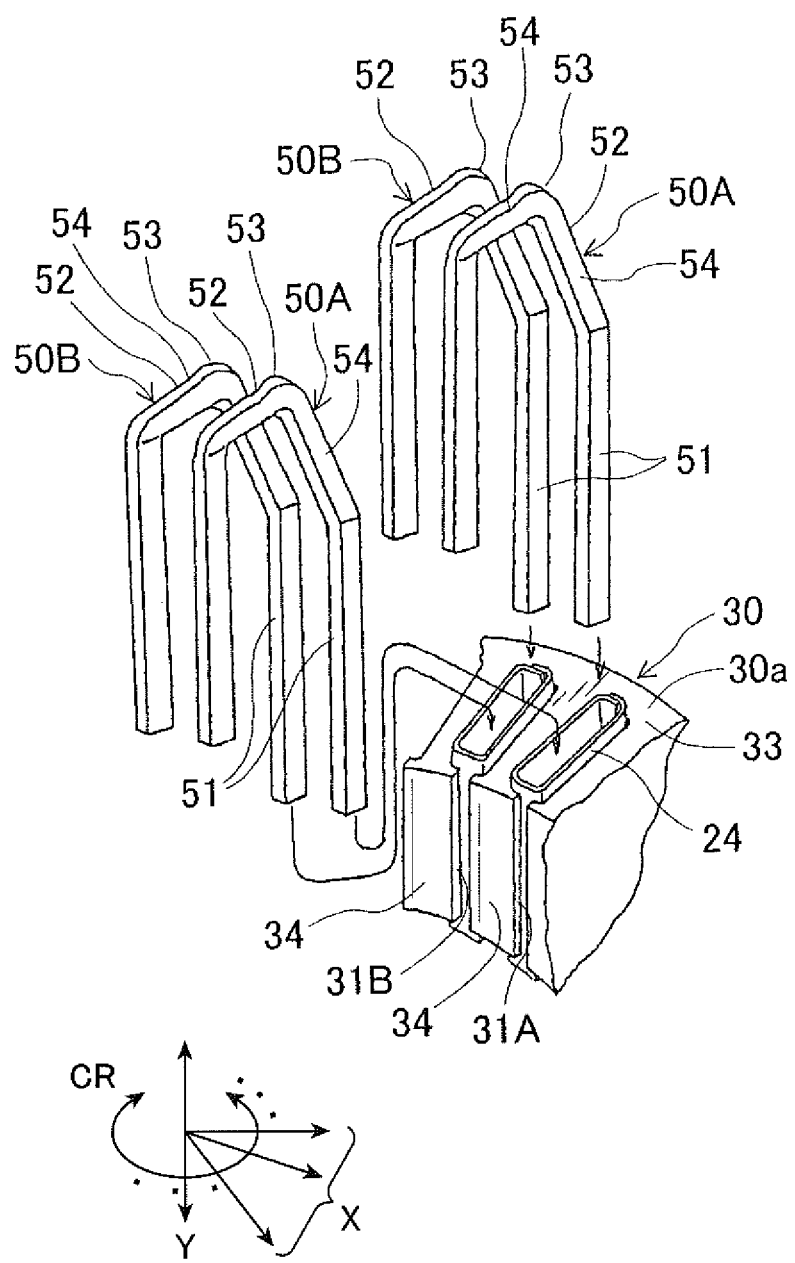
FIG. 4 is an explanatory diagram of a state in which conductor segments are inserted into the slots of a stator core according to the first embodiment.

As shown in FIG. 4, the conductor segment 50, which is formed into a U-shape, is composed of a pair of straight portions 51 and 51 that are parallel to each other and a turn portion 52 that connects together one end of each straight portion 51 and 51. A top stepped portion 53 that extends along an end surface 30a of the stator core 30 is provided in the center portion of the turn portion 52. On both sides of the top stepped portion 53, sloped portions 54 that slope at a predetermined angle in relation to the end surface 30a of the stator core 30 are provided. An insulator 24 provides electrical insulation between the stator core 30 and the stator winding 40.

FIG. 4 shows two conductor segments 50A and 50B that form a pair and are disposed so as to be inserted into two slots 31A and 31B that are adjacent to each other and are of the same phase. In this case, the pair of straight portions 51 and 51 of each of the two conductor segments 50A and 50B is inserted separately into the two adjacent slots 31A and 31B from one axial-direction end side (upper side in FIG. 4), rather than being inserted into the same slot 31. In other words, one straight portion 51 of one conductor segment 50A, of the two conductor segments 50A and 50B on the right side in FIG. 4, is inserted into the outermost layer (eighth layer) of one slot 31A, and the other straight portion 51 is inserted into a seventh layer of another slot (not shown) that is apart from the slot 31A by a single magnetic pole pitch (NS pole pitch) in the counter-clockwise direction of the stator core 30.

Then, one straight portion 51 of the other conductor segment 50B is inserted into the outermost layer (eighth layer) of the slot 31B adjacent to the slot 31A, and the other straight portion 51 is inserted into the seventh layer of another slot (not shown) that is apart from the slot 31B by a single magnetic pole pitch (NS pole pitch) in the counter-clockwise direction of the stator core 30. In other words, the two conductor segments 50A and 50B are disposed so as to be shifted by a single slot pitch in the circumferential direction. In this way, the straight portions 51 of an even number of conductor segments 50 are disposed so as to be inserted into all of the slots 31. According to the present embodiment, a total of eight straight portions 51 are housed in each slot 31 so as to be arrayed in a single row in the radial direction X.

The open end portions of the pair of straight portions 51 and 51 that extend from the slots 31 towards the other axial-direction end side (lower side in FIG. 4) are twisted to opposite sides in a circumstantial direction CR of the rotating electric machine 1, so as to run diagonally at a predetermined angle on the end surface 30a of the stator core 30, thereby forming diagonal portions 55, each having a length that is substantially half the magnetic pole pitch. Then, on the other axial-direction end side of the stator core 30, the tip portions of predetermined diagonal portions 55 of the conductor segments 50 are joined together by welding or the like, and electrically connected in a predetermined pattern. In other words, as a result of the predetermined conductor segments 50 being serially connected, the stator winding 40 having three phase windings 41U, 41V, and 41W that are wound by wave winding in the circumferential direction along the slots 31 of the stator core 30 is formed.

For each phase of the stator winding 40, a winding (coil) that makes eight circuits in the circumferential direction of the stator core 30 is formed by the basic U-shaped conductor segments 50. However, for each phase of the stator winding 40, the segments connected to an output lead line and a neutral point lead line, as well as segments having a turn portion that connects the first circuit and the second circuit, . . . and the seventh circuit and the eighth circuit are each composed of an irregular-shaped segment (not shown) that differs from the basic conductor segment 50.

Figure 5:
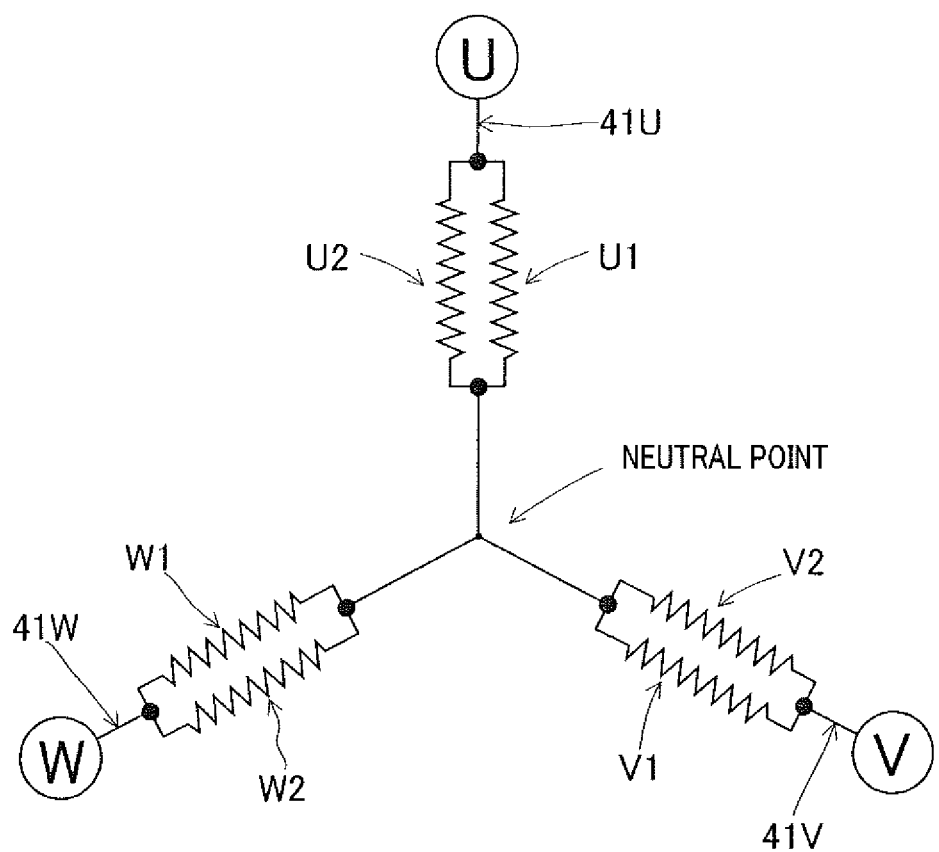
FIG. 5 is a connection wiring diagram of a stator winding according to the first embodiment.

As shown in FIG. 5, the winding end of each phase winding 41U, 41V, and 41W of the stator winding 40 is connected by a Y-connection using these irregular-shaped segments. The phase windings 41U, 41V, and 41W are respectively composed of an n number (n being a natural number, 2 or more) of parallel windings U1 and U2, V1 and V2, and W1 and W2, each of which are connected in parallel (according to the present embodiment, two parallel windings when n=2).

Figure 6:
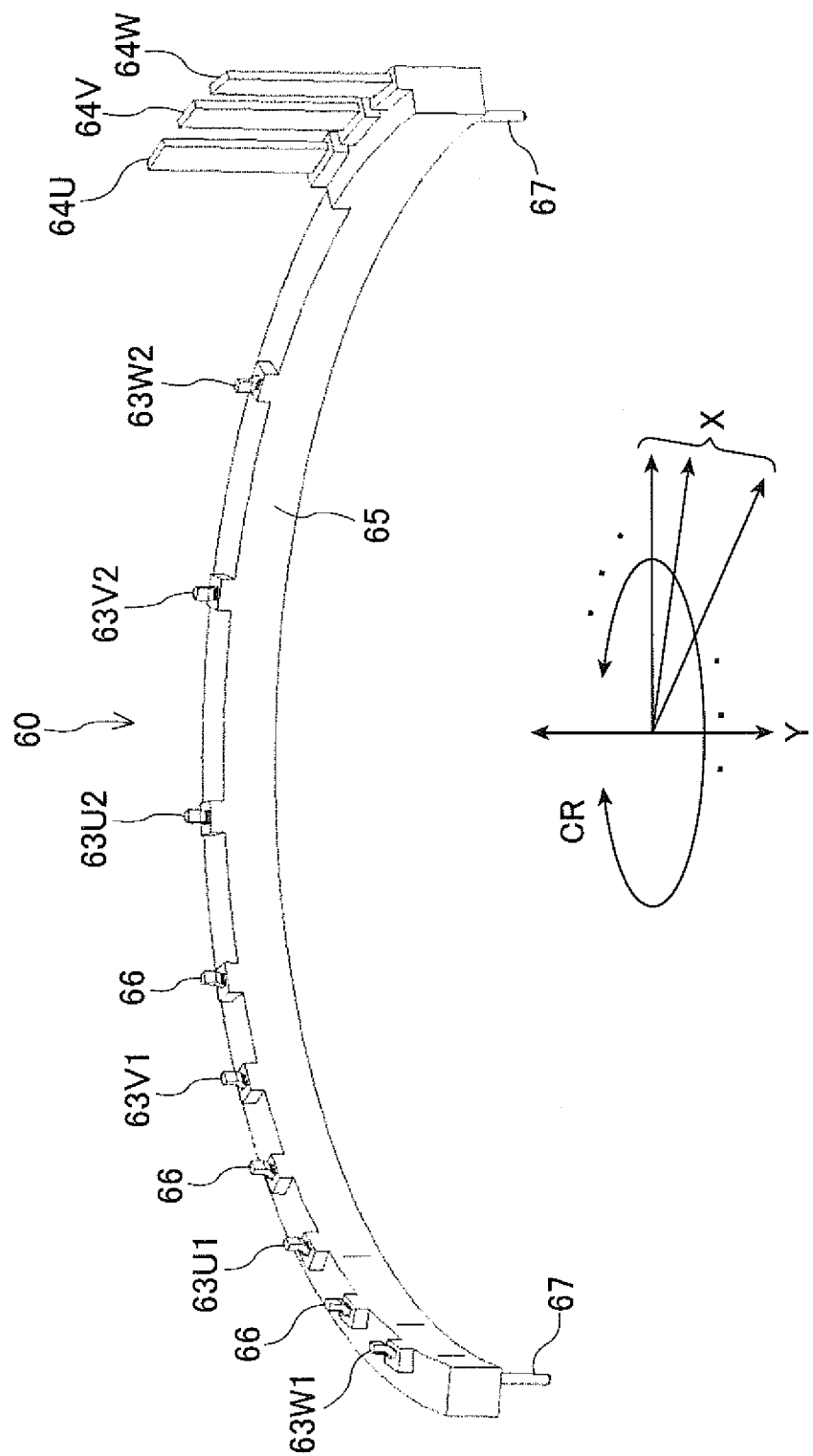
FIG. 6 is a perspective view of a bus bar module according to the first embodiment.
Figure 7:
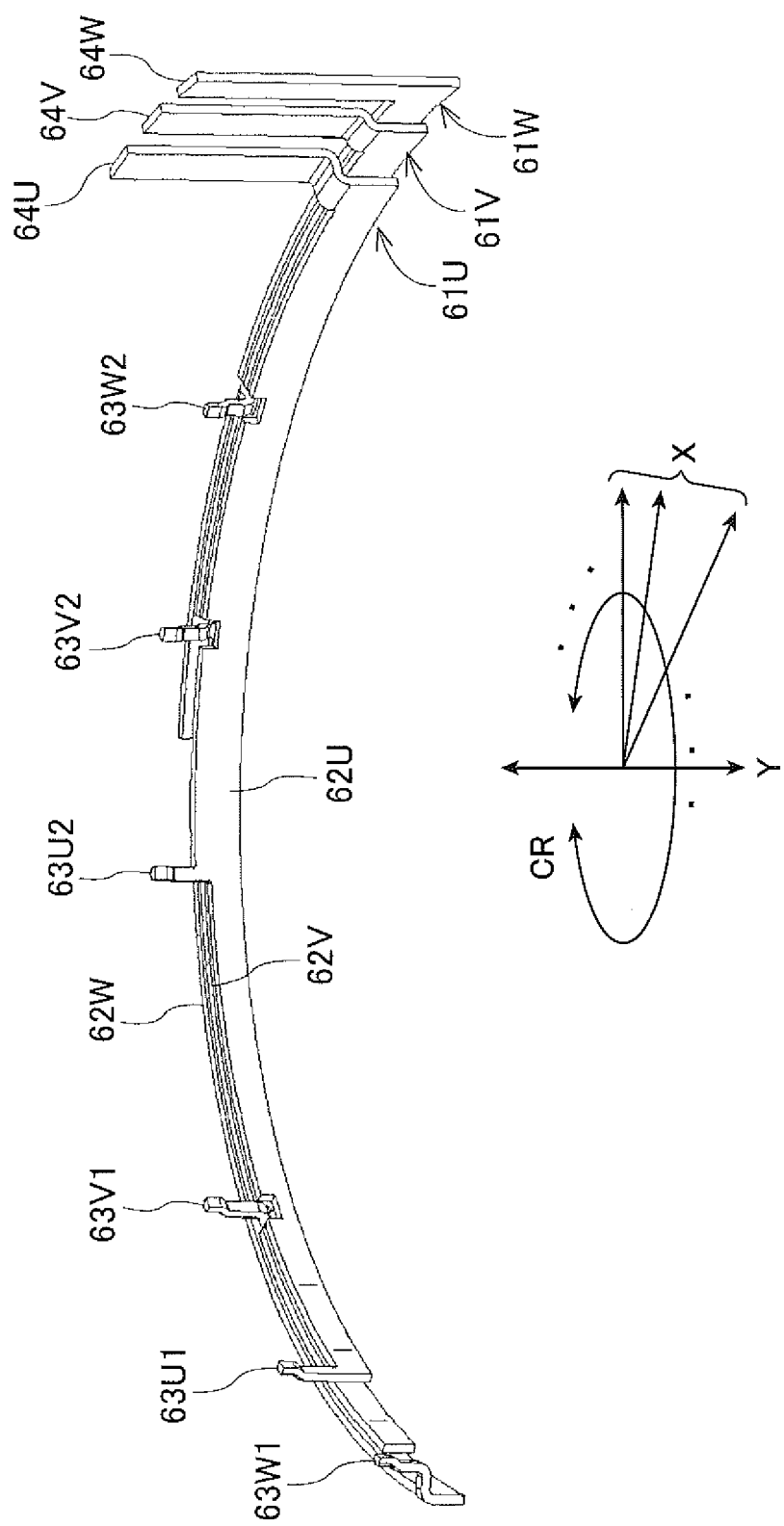
FIG. 7 is a perspective view of three phase bus bars according to the first embodiment.

As shown in FIG. 6, the bus bar module 60 is formed into a circular arc shape and is integrated by the three phase bus bars 61U, 61V, and 61W being integrally molded with a resin (fixing member) 65. The bus bar module 60 is shaped into a circular arc that follows the circular ring shape of the back core 33 of the stator core 30. As shown in FIG. 7, the bus bar module 60 includes therein the U-phase bus bar 61U, the V-phase bus bar 61V, and the W-phase bus bar 61W that are disposed in a state of non-contact with one another, in sequence from the inner circumferential side towards the outer circumferential side.

The phase bus bars 61U, 61V, and 61W electrically connect the phase windings 41U, 41V, and 41W, respectively, to an inverter (not shown) that serves as an external apparatus. The bus bars 61U, 61V, and 61W respectively have two branch portions 63U1 and 63U2, 63V1 and 63V2, and 63W1 and 63W2, and a single trunk portion 62U, 62V, and 62W that electrically connects together the two branch portions 63U1 and 63U2, 63V1 and 63V2, and 63W1 and 63W2.

A terminal portion 64U that is connected to the inverter is provided in one longitudinal-direction end portion (right end portion in FIG. 7) of the trunk portion 62U of the U-phase bus bar 61U. In addition, the two branch portions, first and second branch portions 63U1 and 63U2, that are connected to the two parallel windings U1 and U2 of the U-phase winding 41U are provided in the other longitudinal-direction end portion (left end portion in FIG. 7) and the center portion of the trunk portion 62U.

Figure 8:
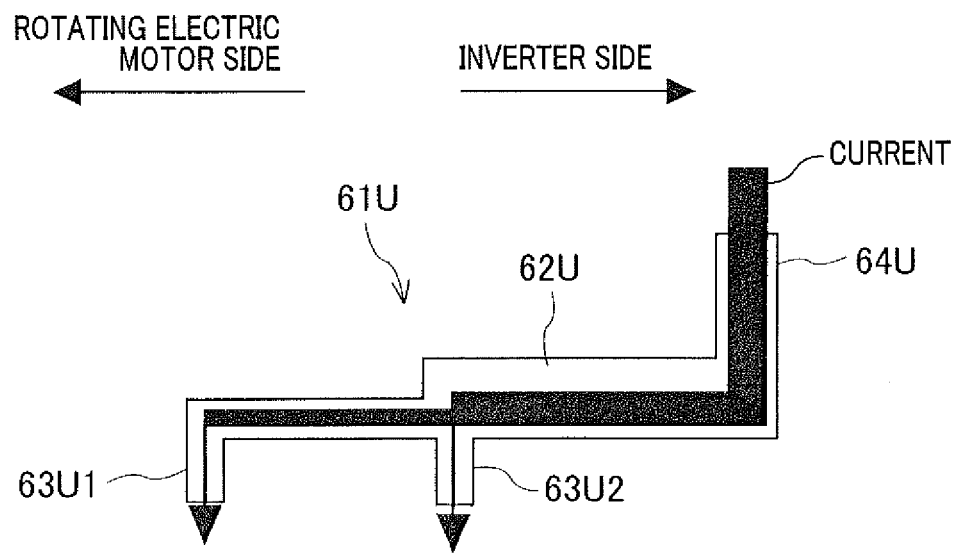
FIG. 8 is an explanatory diagram of a relationship between the current flowing within a U-phase bus bar and a cross-sectional area according to the first embodiment.

As shown in FIG. 8, the trunk portion 62U of the U-phase bus bar 61U is configured such that the cross-sectional area of the section on the first branch portion 63U1 side (rotating electric machine side) is smaller than the cross-sectional area of the section on the terminal portion 64U side (inverter side). In other words, the trunk portion 62U of the U-phase bus bar 61U is configured such that the cross-sectional area decreases in steps of 1/n (½ when n=2) from the inverter side. Because n=2 according to the present embodiment, the trunk portion 62U of the U-phase bus bar 61U is configured such that the cross-sectional area of the section on the U-phase winding 41U side half is smaller than the cross-sectional area of the section on the inverter side half. As a result, the difference in the density of the current flowing through the trunk portion 62U between the two end portions of the trunk portion 62U is reduced.

In addition, in a manner similar to the U-phase bus bar 61U, the V-phase bus bar 61V is provided with a terminal portion 64V that is connected to the inverter, and two branch portions, first and second branched portions 63V 1 and 63V2, that are connected to the two parallel windings V1 and V2 of the V-phase winding 41V. In a manner similar to the trunk portion 62U of the U-phase bus bar 61U, a trunk portion 62V of the V-phase bus bar 61V is also configured such that the cross-sectional area of the section on the first branch portion 63V 1 side (rotating electric machine side) is smaller than the cross-sectional area of the section on the terminal portion 64V side (inverter side). In other words, the trunk portion 62V of the V-phase bus bar 61V is also configured such that the cross-sectional area decreases in steps of 1/n (½ when n=2) from the inverter side. Because n=2 according to the present embodiment, the trunk portion 62V of the V-phase bus bar 61V is configured such that the cross-sectional area of the section on the V-phase winding 41V side half is smaller than the cross-sectional area of the section on the inverter side half. As a result, the difference in the density of the current flowing through the trunk portion 62V between the two end portions of the trunk portion 62V is reduced.

Furthermore, in a manner similar to the U-phase bus bar 61U, the W-phase bus bar 61W is also provided with a terminal portion 64W that is connected to the inverter, and two branch portions, first and second branched portions 63W1 and 63W2, that are connected to the two parallel windings W1 and W2 of the W-phase winding 41W. In a manner similar to the trunk portion 62U of the U-phase bus bar 61U, a trunk portion 62W of the W-phase bus bar 61W is also configured such that the cross-sectional area of the section on the first branch portion 63W 1 side (rotating electric machine side) is smaller than the cross-sectional area of the section on the terminal portion 64W side (inverter side).

In other words, the trunk portion 62W of the W-phase bus bar 61W is also configured such that the cross-sectional area decreases in steps of 1/n (½ when n=2) from the inverter side. Because n=2 according to the present embodiment, the trunk portion 62W of the W-phase bus bar 61W is configured such that the cross-sectional area of the section on the W-phase winding 41W side half is smaller than the cross-sectional area of the section on the inverter side half. As a result, the difference in the density of the current flowing through the trunk portion 62W between the two end portions of the trunk portion 62W is reduced The bus bar module 60 includes therein a neutral line bus bar (not shown) that has three output terminals 66, in addition to the above-described phase bus bars 61U, 61V, and 61W. As shown in FIG. 6, the tip portions of the three output terminals 66 of the neutral line bus bar are exposed from predetermined positions in the bus bar module 60. In addition, two attachment pins 67 for attachment are provided in both longitudinal-direction end portions of the bus bar module 60. The bus bar module 60 is attached to the stator core 30 by the two attachment pins 67 being respectively pressed into two attachment holes (not shown) provided on the one axial-direction end surface of the stator core 30 (upper end surface in FIG. 2) so as to be separated in the circumferential direction.

In the stator 20 according to the present embodiment, configured as described above, the respective trunk portions 62U, 62V, and 62W of the phase bus bars 61U, 61V, and 61W are each configured such that the cross-sectional area of the end portion on the respective phase winding 41U, 41V, and 41W side is smaller than the cross-sectional area of the end portion on the inverter side. As a result, the difference in density of the current flowing through each trunk portion 62U, 62V, and 62W between the two end portions of each trunk portions 62U, 62V, and 62W is reduced, thereby enabling reduction in stress attributed to temperature difference.

In particular, according to the present embodiment, the respective trunk portions 62U, 62V, and 62W of the phase bus bars 61U, 61V, and 61W are each configured such that the cross-sectional area decreases in steps of 1/n (½ when n=2) from the inverter side. Therefore, the current density can be made completely the same between the phase winding 41U, 41V, and 41W side and the inverter side in each trunk portion 62U, 62V and 62W, thereby enabling stress attributed to temperature difference to be reduced with further certainty.

First Variation Example

Figure 9:
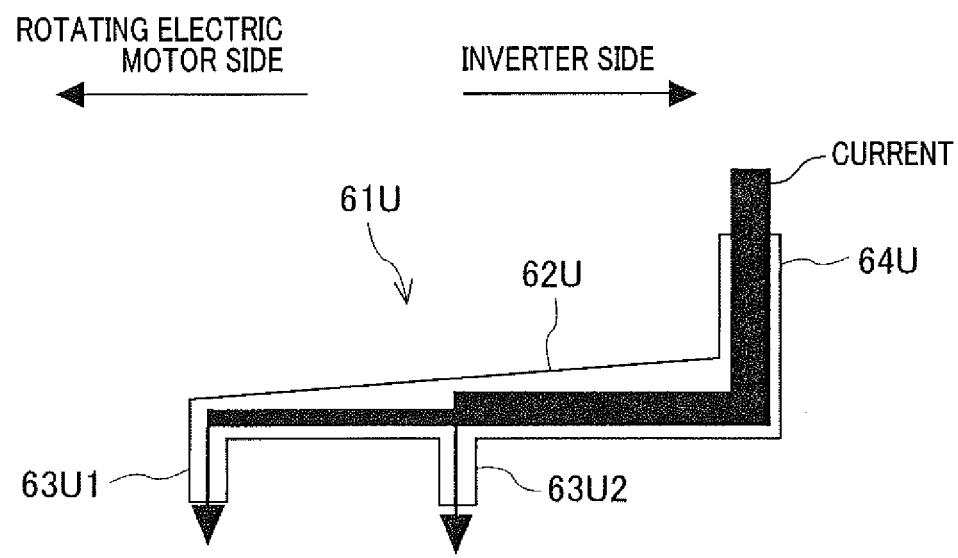
FIG. 9 is an explanatory diagram of the relationship between the current flowing within the U-phase bus bar and the cross-sectional area in a first variation example.

According to the above-described first embodiment, the cross-sectional area of the trunk portion 62U, 62V, and 62V of each phase winding 61U, 61V, and 61W is configured so as to decrease in steps of 1/n from the inverter side. However, the cross-sectional area may smoothly decrease from the end portion on the inverter side towards the end portion on the rotating electric machine side, as in the trunk portion 62U of the U-phase bus bar 61U shown in FIG. 9, for example. Although not shown in the drawings, this configuration similarly applies to the V-phase bus bar 61V and the W-phase bus bar 61W.

Second Embodiment

A stator (not shown) of a rotating electric machine according to a second embodiment is the same as that according to first embodiment in terms of basic configuration. However, the stator according to the second embodiment differs from that according to the first embodiment in that the number of parallel windings configuring each phase winding 41U, 41V, and 41W of the stator winding 40 is four (four parallel windings when n=4), and regarding the structure of a bus bar module 70. Therefore, members and configurations that are shared with the first embodiment are given the same reference numbers, and detailed descriptions thereof are omitted. Differences and important features will hereinafter be described.

Figure 10:
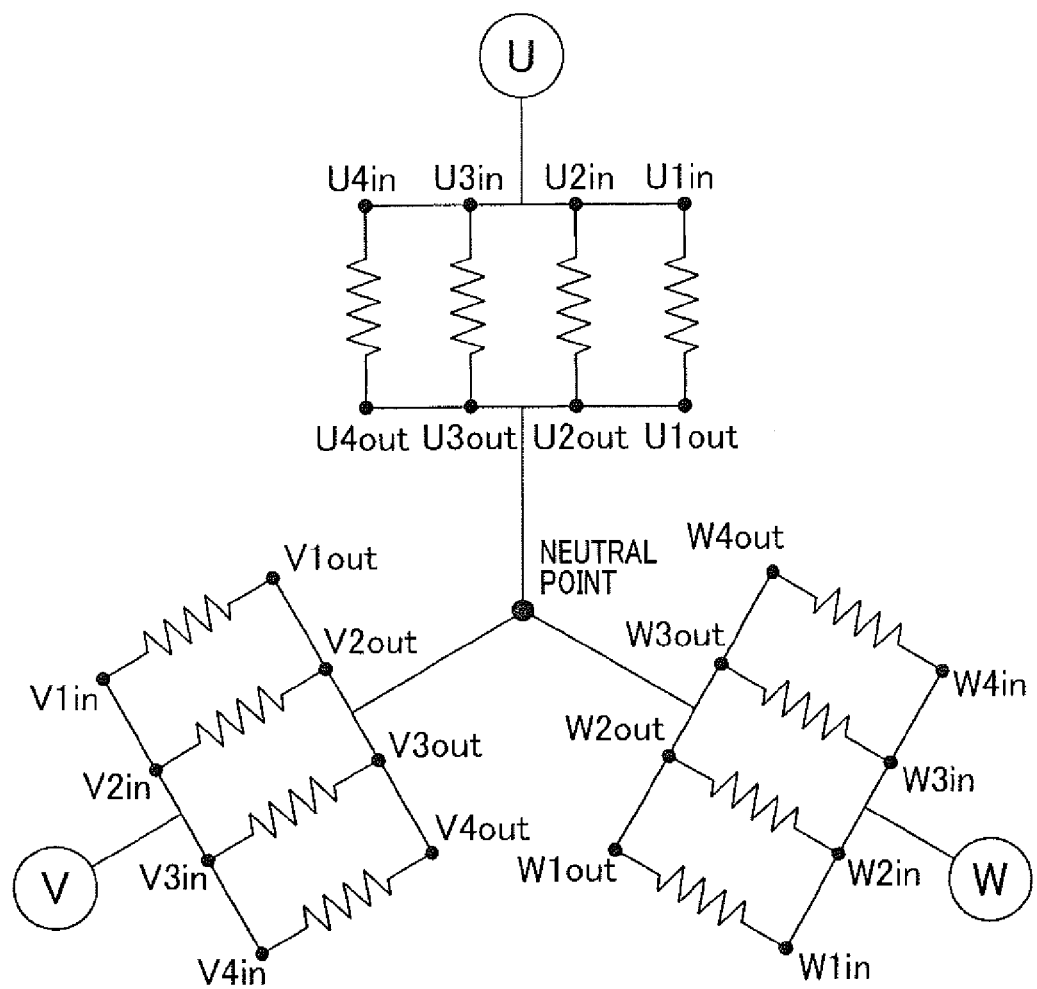
FIG. 10 is a connection wiring diagram of a stator winding according to a second embodiment.

As shown in FIG. 10, in the stator winding 40 according to the second embodiment, the winding end of each phase winding 41U, 41V, and 41W is connected by a Y-connection. The phase windings 41U, 41V, and 41W are respectively composed of four parallel windings U1 to U4, V1 to V4, and W1 to W4, each of which are connected in parallel. In a manner similar to that according to the first embodiment, the stator winding 40 is formed such that a plurality of U-shaped conductor segments are electrically connected in a predetermined pattern.

Figure 11:
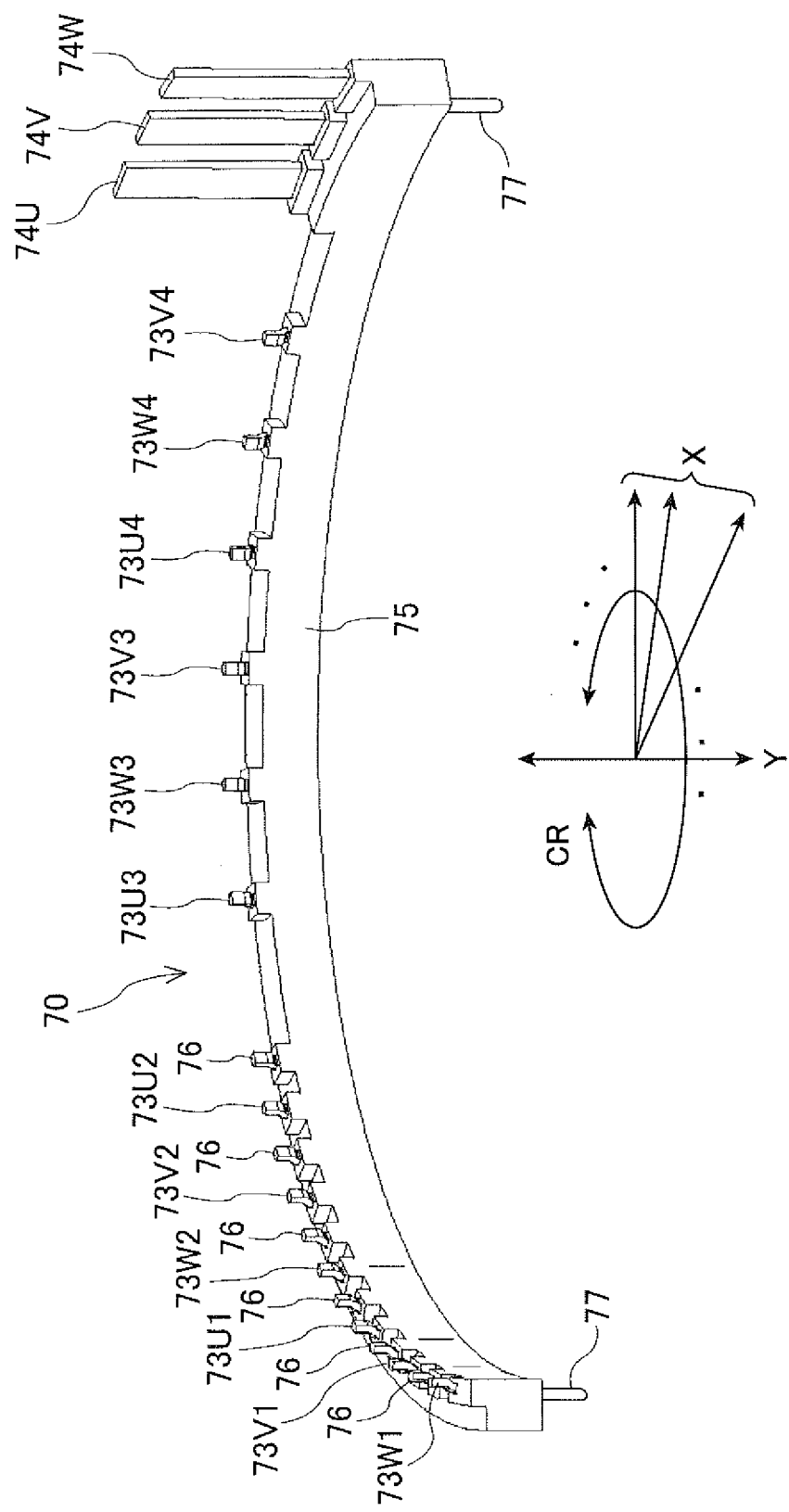
FIG. 11 is a perspective view of a bus bar module according to the second embodiment.
Figure 12:
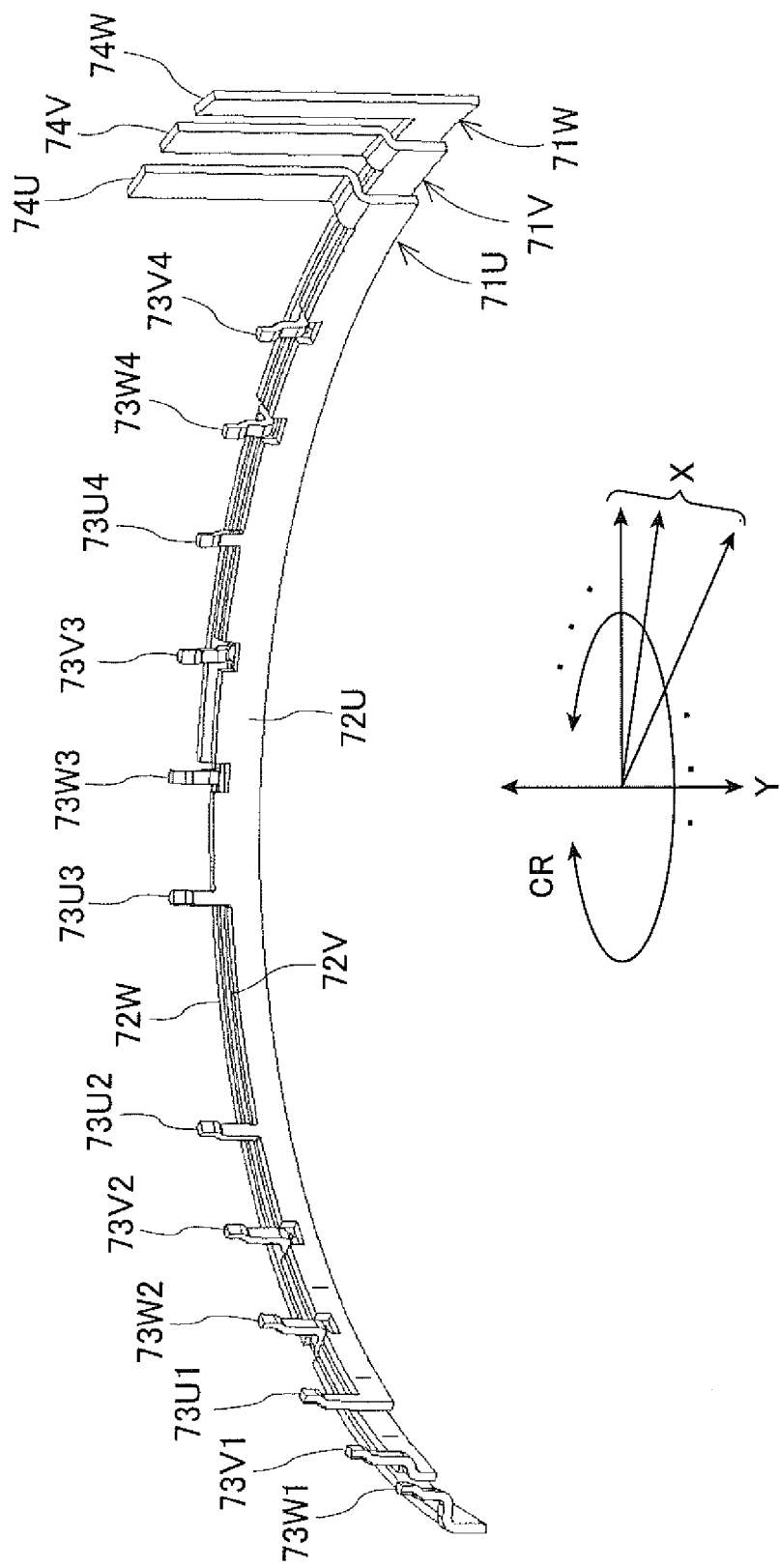
FIG. 12 is a perspective view of three phase bus bars according to the second embodiment.

As shown in FIG. 11, the bus module 70 according to the second embodiment is formed into a circular arc shape by three phase bus bars 71U, 71V, and 71W being integrally molded with a resin (fixing member) 75. The bus bar module 70 is shaped into a circular arc that follows the circular ring shape of the back core 33 of the stator core 30. As shown in FIG. 12, the bus bar module 70 includes therein the U-phase bus bar 71U, the V-phase bus bar 71V, and the W-phase bus bar 71W that are disposed in a state of non-contact with one another, in sequence from the inner circumferential side towards the outer circumferential side.

The phase bus bars 71U, 71V, and 71W electrically connect the phase windings 41U, 41V, and 41W, respectively, to an inverter (not shown) that serves as an external apparatus. The bus bars 71U, 71V, and 71W respectively have four branch portions 73U1 to 73U4, 73V1 to 73V4, and 73W1 to 73W4, and a single trunk portion 72U, 72V, and 72W that electrically connects together the four branch portions 73U1 to 73U4, 73V1 to 73V4, and 73W1 to 73W4.

A terminal portion 74U that is connected to the inverter is provided in one longitudinal-direction end portion (right end portion in FIG. 12) of the trunk portion 72U of the U-phase bus bar 71U. In addition, the four branch portions, first to fourth branch portions 73U1 to 73U4, that are connected to the four parallel windings U1 to U4 of the U-phase winding 41U are provided in four locations in the longitudinal direction of the trunk portion 72U.

Figure 13:
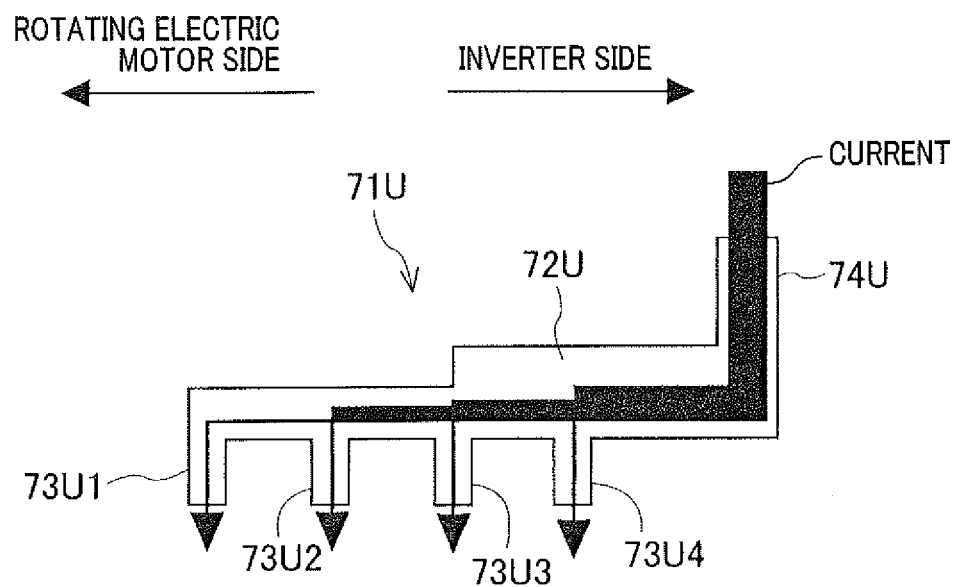
FIG. 13 is an explanatory diagram of a relationship between the current flowing within a U-phase bus bar and a cross-sectional area according to the second embodiment.

As shown in FIG. 13, the trunk portion 72U of the U-phase bus bar 71U is configured such that the cross-sectional area of the section on substantially the first branch portion 73U1 side (rotating electric machine side) half is smaller than the cross-sectional area of the section on substantially the terminal portion 74U side (inverter side) half. As a result, the difference in the density of the current flowing through the trunk portion 72U between the two end portions of the trunk portion 72U is reduced.

In addition, in a manner similar to the U-phase bus bar 71U, the V-phase bus bar 71V is provided with a terminal portion 74V that is connected to the inverter, and four branch portions, first to fourth branched portions 73V 1 to 73V4, that are connected to the four parallel windings V1 to V4 of the V-phase winding 41V. In a manner similar to the trunk portion 72U of the U-phase bus bar 71U, a trunk portion 72V of the V-phase bus bar 71V is also configured such that the cross-sectional area of the section on substantially the first branch portion 73V1 side (rotating electric machine side) half is smaller than the cross-sectional area of the section on substantially the terminal portion 74V side (inverter side) half. As a result, the difference in the density of the current flowing through the trunk portion 72V between the two end portions of the trunk portion 72V is reduced.

Furthermore, in a manner similar to the U-phase bus bar 71U, the W-phase bus bar 71W is provided with a terminal portion 74W that is connected to the inverter, and four branch portions, first to fourth branched portions 73W1 to 73W4, that are connected to the four parallel windings W1 to W4 of the W-phase winding 41W. In a manner similar to the trunk portion 72U of the U-phase bus bar 71U, a trunk portion 72W of the W-phase bus bar 71W is also configured such that the cross-sectional area of the section on substantially the first branch portion 73W1 side (rotating electric machine side) half is smaller than the cross-sectional area of the section on substantially the terminal portion 74W side (inverter side) half. As a result, the difference in the density of the current flowing through the trunk portion 72W between the two end portions of the trunk portion 72W is reduced.

The bus bar module 70 includes therein a neutral line bus bar (not shown) that has six output terminals 76, in addition to the above-described phase bus bars 71U, 71V, and 71W. As shown in FIG. 11, the tip portions of the six output terminals 76 of the neutral line bus bar are exposed from predetermined positions in the bus bar module 70. In addition, two attachment pins 77 for attachment are provided in both longitudinal-direction end portions of the bus bar module 70. The bus bar module 70 is attached to the stator core 30 by the two attachment pins 77 being respectively pressed into two attachment holes (not shown) provided on the one axial-direction end surface of the stator core 30 (upper end surface in FIG. 2) so as to be separated in the circumferential direction.

In the stator 20 according to the second embodiment, configured as described above, the respective trunk portions 72U, 72V, and 72W of the phase bus bars 71U, 71V, and 71W are each configured such that the cross-sectional area of the end portion on the respective phase winding 41U, 41V, and 41W side is smaller than the cross-sectional area of the end portion on the inverter side. As a result, in a manner similar to that according to the first embodiment, the difference in density of the current flowing through each trunk portion 72U, 72V, and 72W between the two end portions of each trunk portions 72U, 72V, and 72W is reduced, thereby enabling reduction in stress attributed to temperature difference.

Second Variation Example

Figure 14:
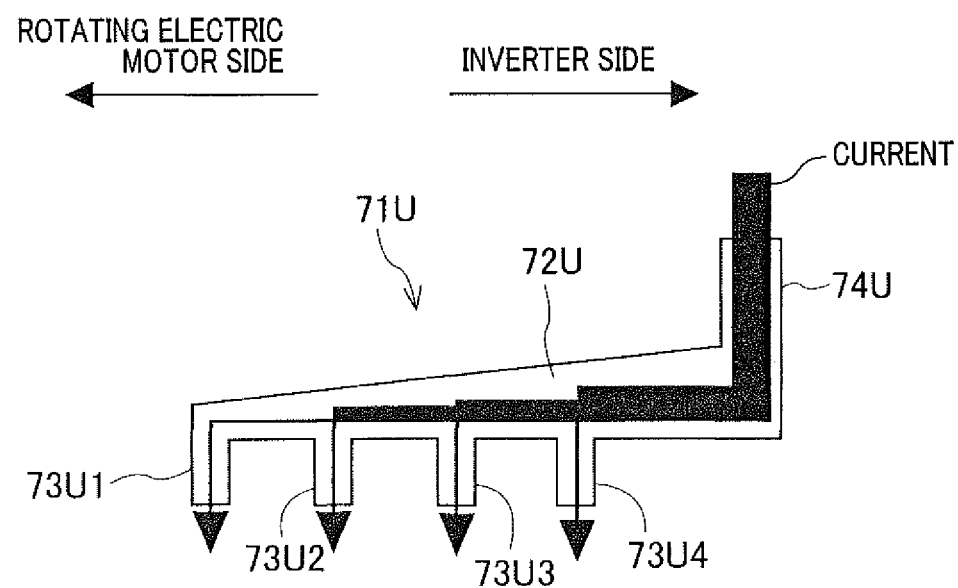
FIG. 14 is an explanatory diagram of the relationship between the current flowing within the U-phase bus bar and the cross-sectional area in a second variation example.

According to the above-described second embodiment, the trunk portion 72U, 72V, and 72V of each phase winding 71U, 71V, and 71W is configured such that the cross-sectional area of the end portion on the rotating electric machine side is smaller than the cross-sectional area of the end portion on the inverter side. However, the cross-sectional area may smoothly decrease from the end portion on the inverter side towards the end portion on the rotating electric machine side, as in the trunk portion 72U of the U-phase bus bar 71U shown in FIG. 14, for example. Although not shown in the drawings, this configuration similarly applies to the V-phase bus bar 71V and the W-phase bus bar 71W.

Third Variation Example

Figure 15:
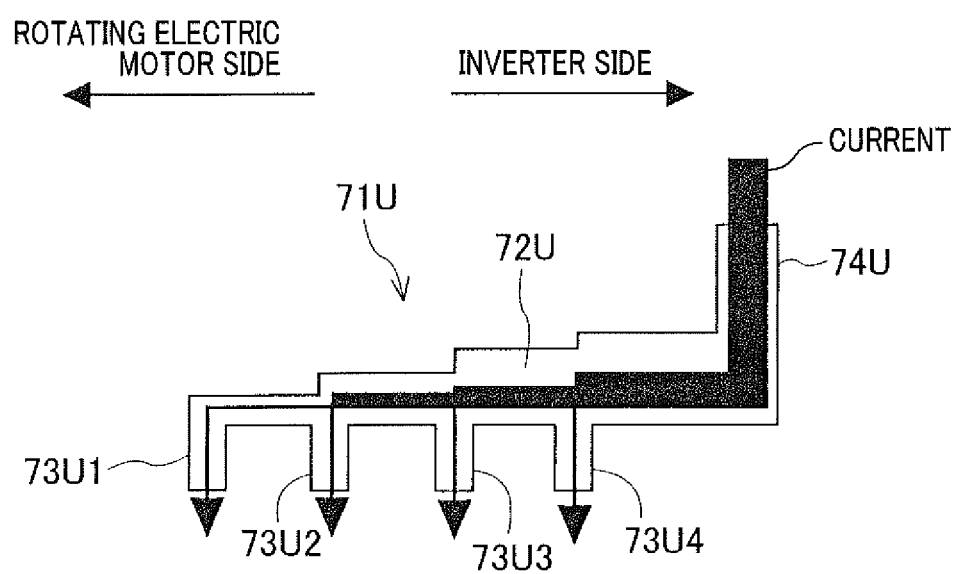
FIG. 15 is an explanatory diagram of the relationship between the current flowing within the U-phase bus bar and the cross-sectional area in a third variation example.

According to the above-described second embodiment, the cross-sectional area of the trunk portion 72U, 72V, and 72V of each phase winding 71U, 71V, and 71W is configured so as to decrease in steps of 112 from the inverter side towards the rotating electric machine side. However, instead, the cross-sectional area may decrease in steps of 1/n from the inverter side based on the number (n) of parallel windings U1 to U4 configuring the U-phase winding 41U, as in the trunk portion 72U of the U-phase bus bar 71U shown in FIG. 15, for example. In a third variation example, because four (when n=4) parallel windings U1 to U4 configuring the U-phase winding 41U are provided, the trunk portion 72U of the U-phase bus bar 71U is configured such that the cross-sectional area decreases in steps of 1/n (¼ when n=4) from the inverter side. Although not shown in the drawings, this configuration similarly applies to the V-phase bus bar 71V and the W-phase bus bar 71W.

In the third variation example, the density of the current flowing through each trunk portion 72U, 72V, and 72W can be made completely the same throughout the overall area from the inverter side to the rotating electric machine side of each trunk portion 72U, 72V, and 72W. Therefore, stress attributed to temperature difference can be reduced with further certainty.

Third Embodiment

Figure 16:
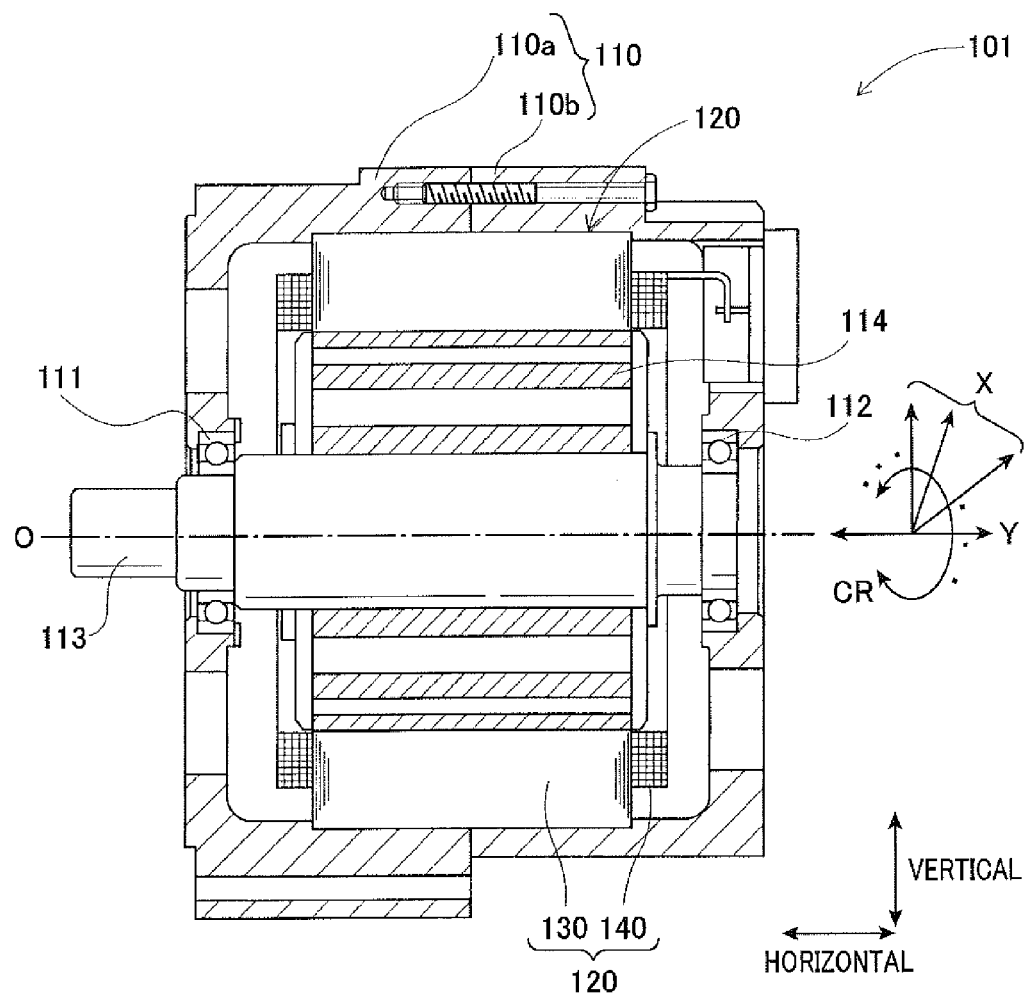
FIG. 16 is an axial-direction cross-sectional view of a rotating electric machine in which a stator is mounted according to a third embodiment.

FIG. 16 shows a rotating electric machine 101 in which a stator 120 according to a third present embodiment is mounted. This rotating electric machine 101 is used as an electric motor for a vehicle. As shown in FIG. 16, the rotating electric machine 101 includes a housing 110 that is composed by a pair of bottomed tube-shaped housing members 110a and 110b being joined together at respective opening portions, a rotating shaft 113 that is supported so as to rotate freely in the housing 110 by bearings 111 and 112, a rotor 114 that is fitted onto the outer circumference of the rotating shaft 113 and fixed thereto, and a stator 120 that is disposed so as to oppose the rotor 114 in a radial direction X of the rotating electric machine 101 on the outer side of the rotor 114.

The rotor 114 has a plurality of magnetic poles disposed on the outer circumferential side opposing the inner circumferential side of the stator 120 in the radial direction X, so as to be spaced apart by a predetermined distance in the circumferential direction and such that the polarities alternately differ in the circumferential direction. These magnetic poles are formed by a plurality of pairs of permanent magnets 115 (see FIG. 23) that are disposed in V-shapes in predetermined positions in the rotor 114. Two permanent magnets 115 form a single pair, and each pair forms a single magnetic pole. The number of magnetic poles in the rotor 114 is not limited because the quantity differs depending on rotating electric machine. According to the present embodiment, a rotor having eight poles (four N poles and four S poles) is used.

Figure 17:
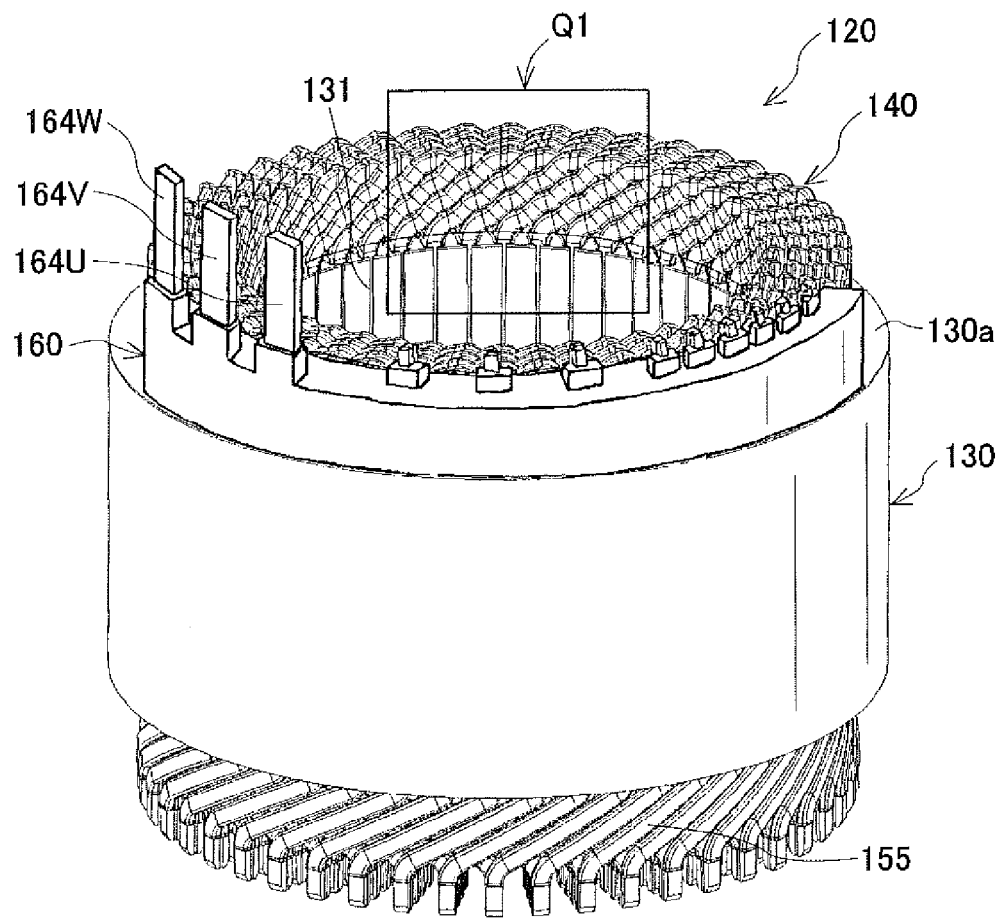
FIG. 17 is an overall perspective view of the stator according to the third embodiment.
Figure 18:
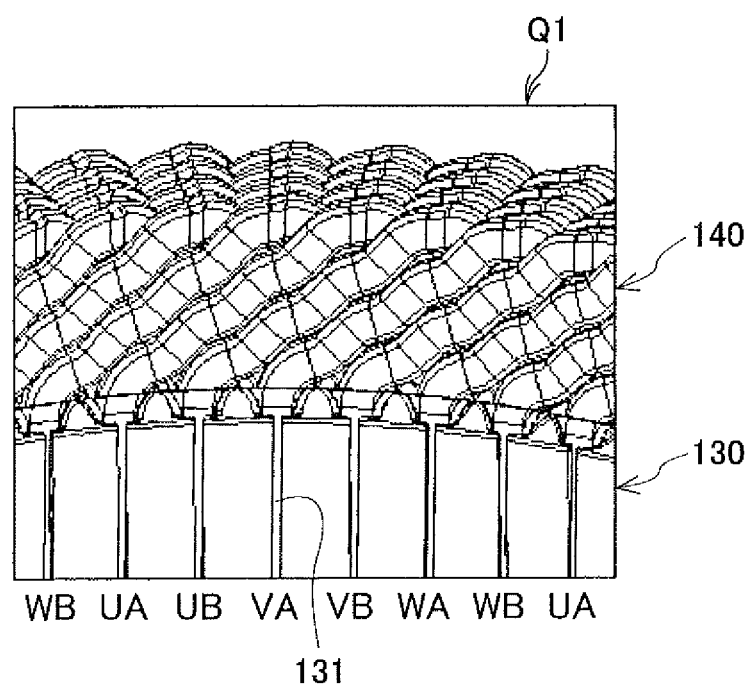
FIG. 18 is an enlarged view of section Q in FIG. 17.

Next, the stator 120 will be described with reference to FIGS. 17 to 24. As shown in FIGS. 17 and 18, the stator 120 includes an annular stator core 130 that has a plurality of slots 131 in the circumferential direction, a stator winding 140 composed of phase windings 141U, 141V, and 141W of three phases (U-phase, V-phase, and W-phase) of differing electrical phases that are wound around the slots 131 of the stator core 130, and a bus bar module 160 that is attached to the stator core 130 and has three phase bus bars 161U, 161V, and 161W that electrically connect the respective phase windings 141U, 141V, and 141W to an inverter that serves as an external apparatus (not shown).

The stator core 130 is an integrated type that is formed by a plurality of annular electromagnetic steel plates being laminated in an axial direction Y of the stator core 130. The stator core 130 is composed of an annular back core 133 and a plurality of teeth 134 that project from the back core 133 towards the inward radial direction and are arrayed so as to be spaced apart by a predetermined distance in the circumferential direction. Each slot 131 is formed between adjacent teeth 34 (see FIG. 19). The number of slots 131 formed in the stator core 130 is set such that two slots 131 are formed for each phase of the winding 140, for each magnetic pole (eight poles) of the rotor 114. In the present embodiment, based on 8×3×2=48, 48 slots are provided. In other words, the 48 slots 131 are composed of U-phase slots UA and UB, V-phase slots VA and VB, and W-phase slots WA and WB that are sequentially and repeatedly arranged in quantity n at a time (in twos when n=2) in the circumferential direction (see FIG. 18). The slot multiple n is set to 2.

The stator winding 140 is configured by a plurality of U-shaped conductor segments 150 being joined together by welding at the end portions on the open end side. The conductor segment 150 is formed by a flat (rectangular) conducting wire, composed of a conductor having a rectangular cross-section and an insulating film that covers the outer peripheral surface of the conductor, being bent into a U shape.

Figure 19:
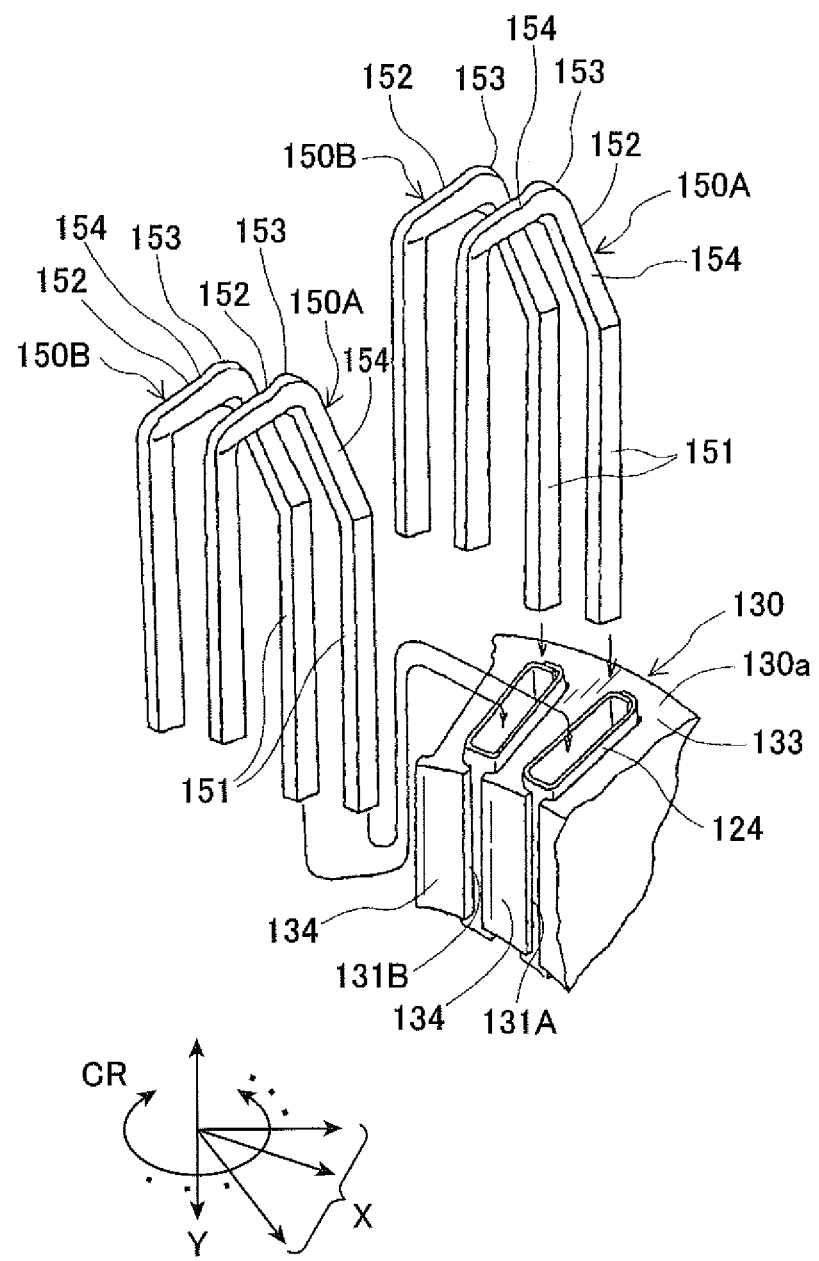
FIG. 19 is an explanatory diagram of a state in which conductor segments are inserted into the slots of a stator core according to the third embodiment.

As shown in FIG. 19, the conductor segment 150, which is formed into a U-shape, is composed of a pair of straight portions 151 and 151 that are parallel to each other and a turn portion 152 that connects together one end of each straight portion 151 and 151. A top stepped portion 153 that extends along an end surface 30a of the stator core 130 is provided in the center portion of the turn portion 152. On both sides of the top stepped portion 153, sloped portions 154 that slope at a predetermined angle in relation to the end surface 130a of the stator core 130 are provided. An insulator 124 provides electrical insulation between the stator core 130 and the stator winding 140.

FIG. 19 shows two conductor segments 150A and 150B that form a pair and are disposed so as to be inserted into two slots 131A and 131B that are adjacent to each other and are of the same phase. In this case, the pair of straight portions 151 and 151 of each of the two conductor segments 150A and 150B is inserted separately into the two adjacent slots 131A and 131B from one axial-direction end side (upper side in FIG. 19), rather than being inserted into the same slot 131. In other words, one straight portion 151 of one conductor segment 150A, of the two conductor segments 150A and 150B on the right side in FIG. 19, is inserted into the outermost layer (eighth layer) of one slot 131A, and the other straight portion 151 is inserted into a seventh layer of another slot (not shown) that is apart from the slot 131A by a single magnetic pole pitch (NS pole pitch) in the counter-clockwise direction of the stator core 130.

Then, one straight portion 151 of the other conductor segment 150B is inserted into the outermost layer (eighth layer) of the slot 131B adjacent to the slot 131A, and the other straight portion 151 is inserted into the seventh layer of another slot (not shown) that is apart from the slot 131B by a single magnetic pole pitch (NS pole pitch) in the counter-clockwise direction of the stator core 130. In other words, the two conductor segments 150A and 150B are disposed so as to be shifted by a single slot pitch in the circumferential direction. In this way, the straight portions 151 of an even number of conductor segments 150 are disposed so as to be inserted into all of the slots 131. According to the present embodiment, a total of eight straight portions 151 are housed in each slot 131 so as to be arrayed in a single row in the radial direction X.

The open end portions of the pair of straight portions 151 and 151 that extend from the slots 131 towards the other axial-direction end side (lower side in FIG. 19) are twisted to opposite sides in a circumstantial direction CR of the rotating electric machine 101, so as to run diagonally at a predetermined angle on the end surface 130a of the stator core 130, thereby forming diagonal portions 155 (see FIG. 17), each having a length that is substantially half the magnetic pole pitch.

Then, on the other axial-direction end side of the stator core 130, the tip portions of predetermined diagonal portions 155 of the conductor segments 150 are joined together by welding or the like, and electrically connected in a predetermined pattern. In other words, as a result of the predetermined conductor segments 150 being serially connected, the stator winding 140 having three phase windings 141U, 141V, and 141W that are wound by wave winding in the circumferential direction along the slots 131 of the stator core 130 is formed.

Figure 20:
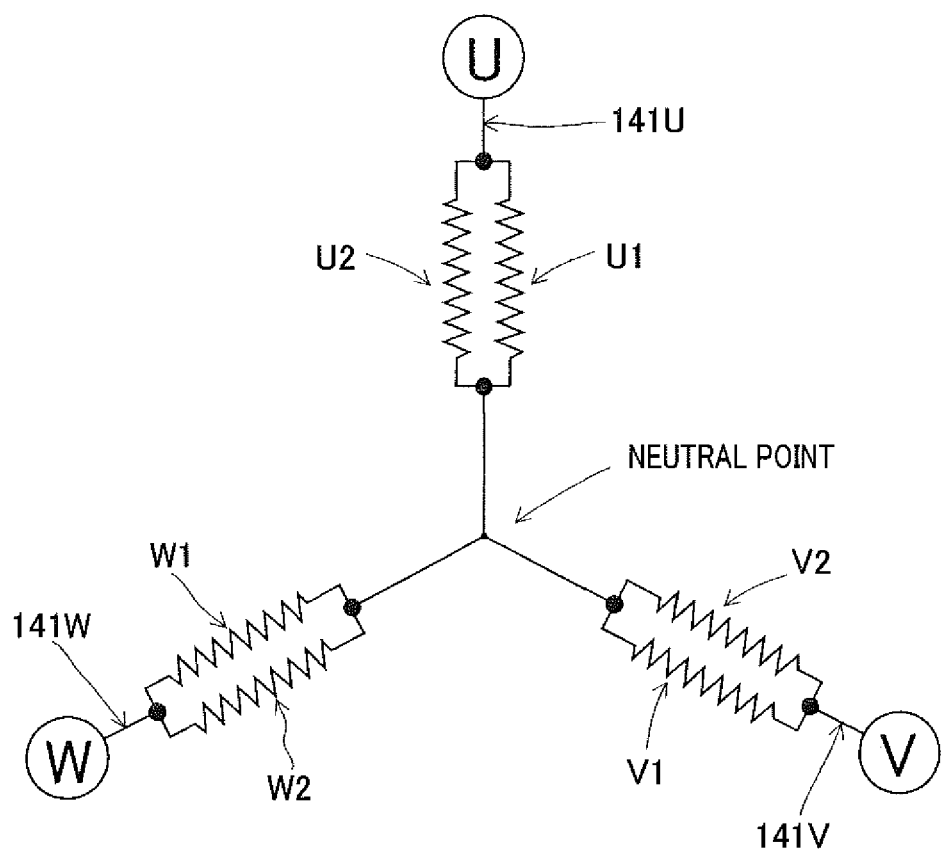
FIG. 20 is a connection wiring diagram of a stator winding according to the third embodiment.

For each phase of the stator winding 140, a winding (coil) that makes eight circuits in the circumferential direction of the stator core 130 is formed by the basic U-shaped conductor segments 150. However, for each phase of the stator winding 140, the segments connected to an output lead line and a neutral point lead line, as well as segments having a turn portion that connects the first circuit and the second circuit, . . . and the seventh circuit and the eighth circuit are each composed of an irregular-shaped segment (not shown) that differs from the basic conductor segment 150. As shown in FIG. 20, the winding end of each phase winding 141U, 141V, and 141W of the stator winding 40 is connected by a Y-connection using these irregular-shaped segments. According to the present embodiment, the phase windings 141U, 141V, and 141W are respectively composed of two parallel windings U1 and U2, V1 and V2, and W1 and W2, each of which are connected in parallel.

Figure 21:
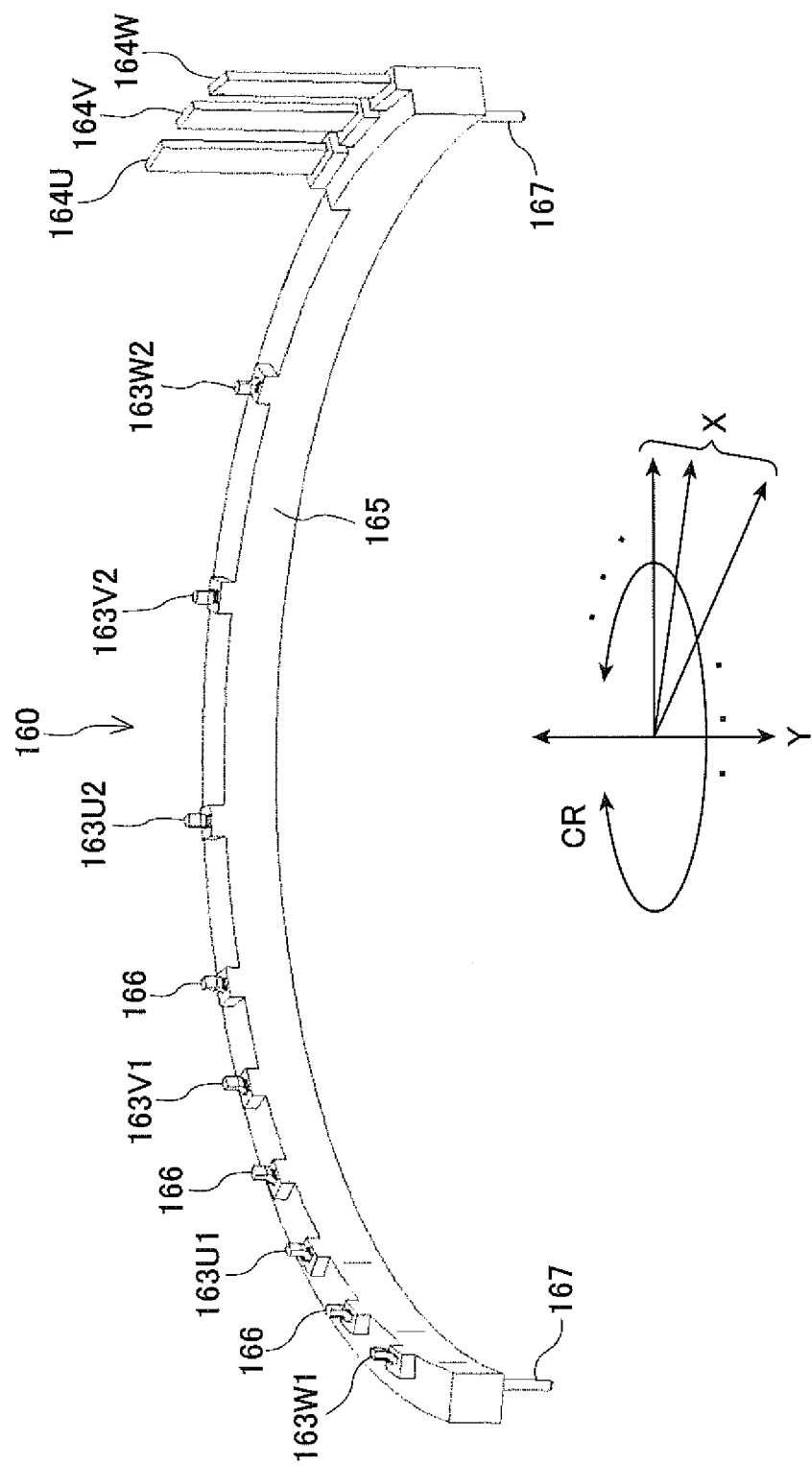
FIG. 21 is a perspective view of a bus bar module according to the third embodiment.
Figure 22:
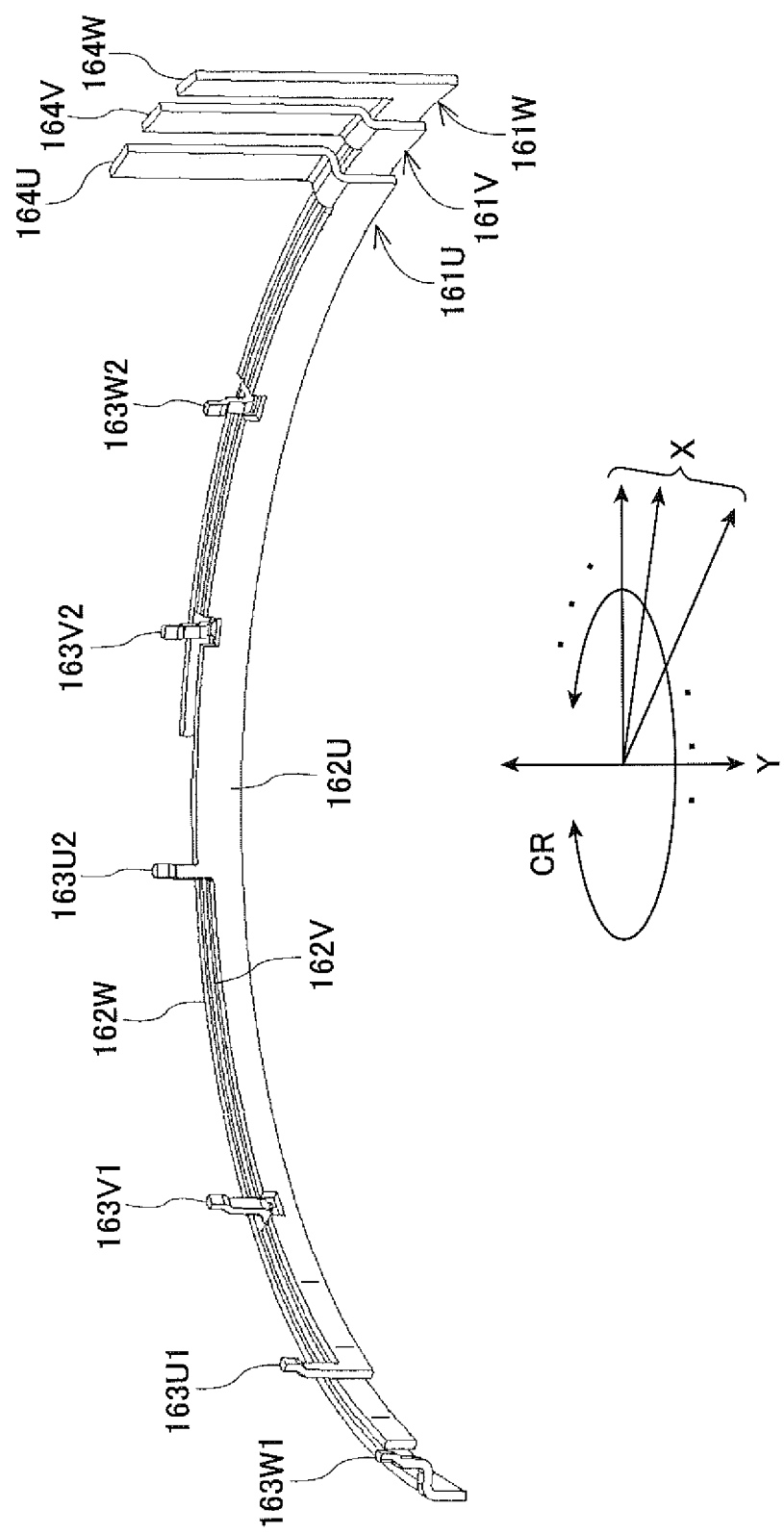
FIG. 22 is a perspective view of three phase bus bars according to the third embodiment.

As shown in FIG. 21, the bus bar module 160 is formed into a circular arc shape and is integrated by the three phase bus bars 161U, 161V, and 161W, a neutral line bus bar (not shown), and two attachment pins 167 being integrally molded with a resin (fixing member) 165. The bus bar module 160 is shaped into a circular arc that follows the circular ring shape of the back core 133 of the stator core 130. As shown in FIG. 22, the bus bar module 60 includes therein the U-phase bus bar 161U, the V-phase bus bar 161V, and the W-phase bus bar 161W that are disposed in a state of non-contact with one another, in sequence from the inner circumferential side towards the outer circumferential side.

The phase bus bars 161U, 161V, and 161W electrically connect the phase windings 141U, 141V, and 141W, respectively, to the inverter (not shown) that serves as an external apparatus. The bus bars 161U, 161V, and 161W respectively have two branch portions 163U1 and 163U2, 163V1 and 163V2, and 163W1 and 163W2, and a single trunk portion 162U, 162V, and 162W that electrically connects together the two branch portions 163U1 and 163U2, 163V1 and 163V2, and 163W1 and 163W2.

A terminal portion 164U that is connected to the inverter is provided in one longitudinal-direction end portion (right end portion in FIG. 22) of the trunk portion 162U of the U-phase bus bar 161U. In addition, the two branch portions, first and second branch portions 163U1 and 163 U2, that are connected to the two parallel windings U1 and U2 of the U-phase winding 141U are provided in the other longitudinal-direction end portion (left end portion in FIG. 22) and the center portion of the trunk portion 162U.

In addition, in a manner similar to the U-phase bus bar 161U, the V-phase bus bar 161V is also provided with a terminal portion 164V that is connected to the inverter and the two branch portions, first and second branch portions 163V1 and 163V2, that are connected to the two parallel windings V1 and V2 of the V-phase winding 141V.

Furthermore, in a manner similar to the U-phase bus bar 161U, the W-phase bus bar 161W is also provided with a terminal portion 164W that is connected to the inverter and the two branch portions, first and second branch portions 163W 1 and 163W2, that are connected to the two parallel windings W1 and W2 of the W-phase winding 141W.

The neutral line bus bar (not shown) has three output terminals 166. As shown in FIG. 21, the tip portions of the three output terminals 166 are exposed from predetermined positions in the bus bar module 160.

Figure 23:
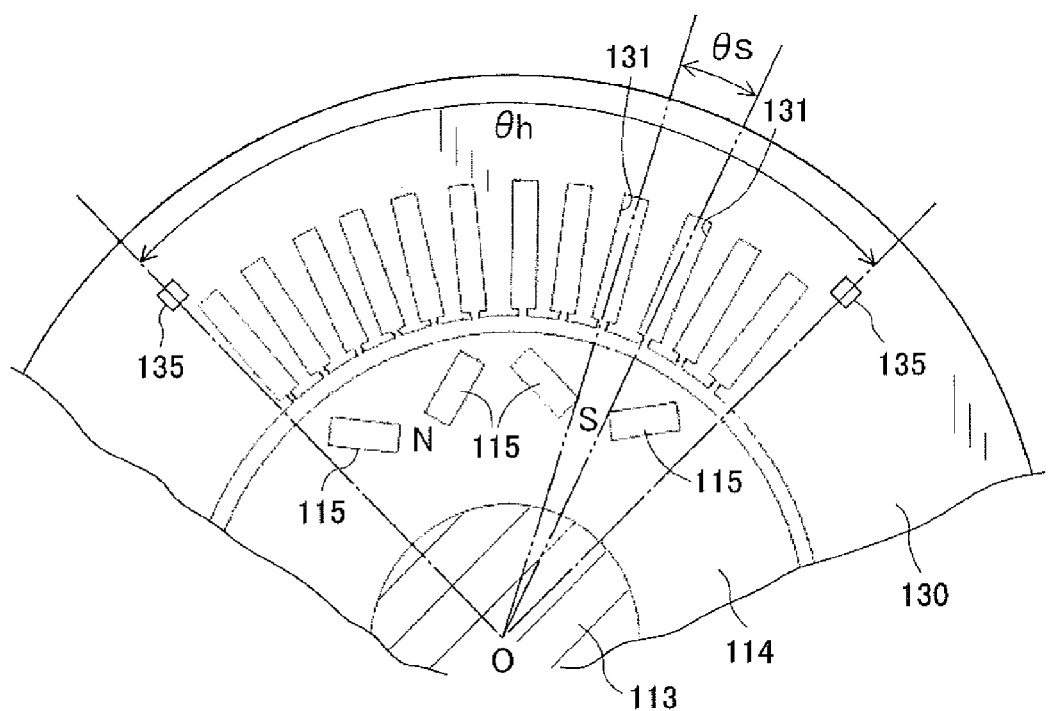
FIG. 23 is an explanatory diagram of the positions in which attachment holes are provided in the stator core according to the third embodiment.

In addition, two metal attachment pins 167 are provided in both longitudinal-direction end portions of the bus bar module 160. The bus bar module 160 is attached to the stator core 130 by the two attachment pins 167 being respectively pressed into two attachment holes 135 provided on the one axial-direction end surface of the stator core 130 (upper end surface in FIG. 17) so as to be separated in the circumferential direction As shown in FIG. 23, the two attachment holes 135 provided in the stator core 130 are formed such that, when an angle formed by two slots 131 that are adjacent to each other in the circumferential direction around an axial line O (in the axial direction Y) of the stator core 130 is θs, an angle θh formed by the two attachment holes 135 that are adjacent to each other in the circumferential direction around the axial line O is determined by θh≈m (m being a positive integer)×6×n×θs. Here, m corresponds to the number of magnetic pole pairs present between the two attachment pins 167 that are adjacent in the circumferential direction.

According to the present embodiment, the angle θs is 360°÷48=7.5°. The slot multiple n is 2, and m=1. Therefore, the angle θh is 1×6×2×7.5°=90°. In other words, the pitch of the two attachment holes 135 that are adjacent to each other in the circumferential direction is the integral multiple (m times) of the pitch of the magnetic pole pairs. As a result, generation of eddy currents flowing through the attachment pins 167 inserted into the attachment holes 135 is suppressed, and increase in loss is suppressed.

Figure 24:
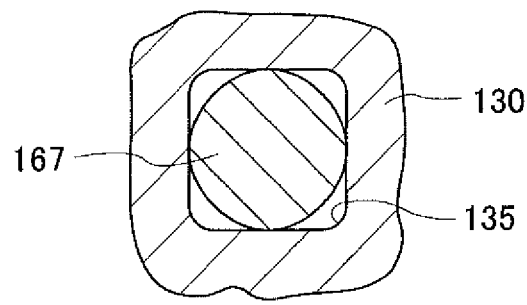
FIG. 24 is an explanatory diagram of a relationship between the shapes of the attachment hole and attachment pin according to the third embodiment.

In addition, according to the present embodiment, as shown in FIG. 24, the two attachment holes 135 each have a rectangular cross-sectional shape. The cross-sectional shape of each of the two attachment pins 167 is a circle of a size enabling a portion of the attachment pin 167 in the circumferential direction to be pressed against the wall surface of the attachment hole 135. Therefore, as a result of the contact area of the attachment pin 167 pressed into the attachment hole 135 being reduced and electrical resistance being increased, generation of eddy currents is suppressed.

In the stator 120 according to the present embodiment, configured as described above, the two attachment holes 135 provided in the stator core 130 are provided in positions determined by the angle θh formed by the two attachment holes 135 that are adjacent to each other in the circumferential direction around the axial line O. Therefore, as a result of the pitch of the two attachment holes 135 that are adjacent to each other in the circumferential direction being set to an integral multiple of the pitch of the magnetic pole pair, changes in magnetic flux within a loop formed via the attachment pins 167 of the bus bar module 160 pressed into the attachment holes 135 of the stator core 130 can be apparently eliminated. As a result, generation of eddy currents can be suppressed and increase in loss can be suppressed.

In addition, according to the present embodiment, the two attachment holes 135 are each formed so as to have a rectangular cross-sectional shape. The cross-sectional shape of each of the two attachment pins 167 is formed into a circle of a size enabling a portion of the attachment pin 167 in the circumferential direction to be pressed against the wall surface of the attachment hole 135. Therefore, as a result of the contact area of the attachment pin 167 pressed into the attachment hole 135 being reduced and electrical resistance being increased, eddy currents caused by dimensional variations, eccentricity, and the like in the rotor 114 can also be suppressed with further certainty. Although not shown in the drawings, the relationship between the cross-sectional shapes of the attachment hole 135 and the attachment pin 167 may be reversed.

Fourth Variation Example

According to the above-described third embodiment, the cross-sectional shape of the attachment hole 135 is a rectangle, and the cross-sectional shape of the attachment pin 167 is a circle of a size enabling a portion of the attachment pin 167 in the circumferential direction to be pressed against the wall surface of the attachment hole 135.

Figure 25:
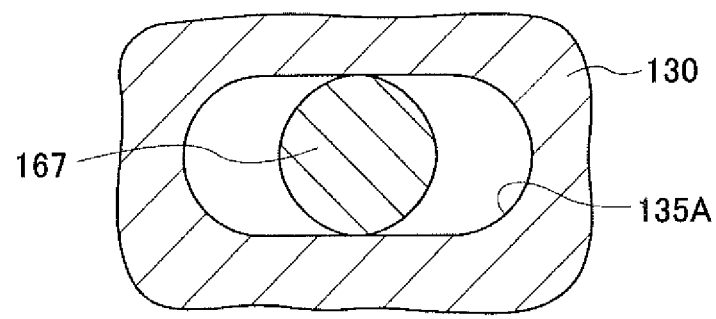
FIG. 25 is an explanatory diagram of the relationship between the shapes of the attachment hole and attachment pin in a fourth variation example.

However, instead, the shapes of the attachment hole 135 and the attachment pin 167 may be formed as in a fourth variation example shown in FIG. 25. In other words, in the fourth variation example, the cross-sectional shape of an attachment hole 135A is formed into an elliptical shape, and the cross-sectional shape of the attachment pin 167 is formed into a circle of a size enabling a portion of the attachment pin 167 in the circumferential direction to be pressed against the wall surface of the attachment hole 135A.

In the fourth variation example as well, workings and effects similar to those according to the first embodiment can be achieved. Although not shown in the drawings, the relationship between the cross-sectional shapes of the attachment hole 135A and the attachment pin 167 may be reversed in the fourth variation example as well.

Fifth Variation Example

Figure 26:
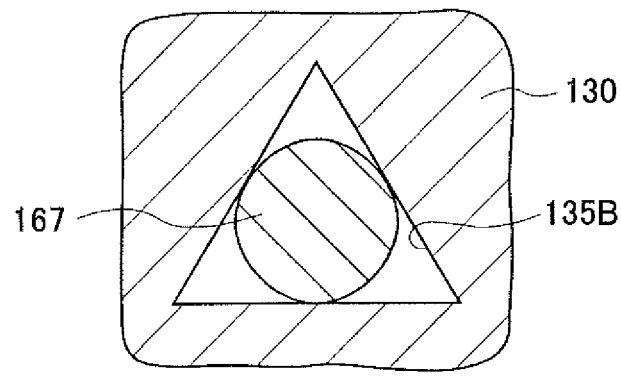
FIG. 26 is an explanatory diagram of a relationship between the shapes of the attachment hole and attachment pin in a fifth variation example.
Figure 27:
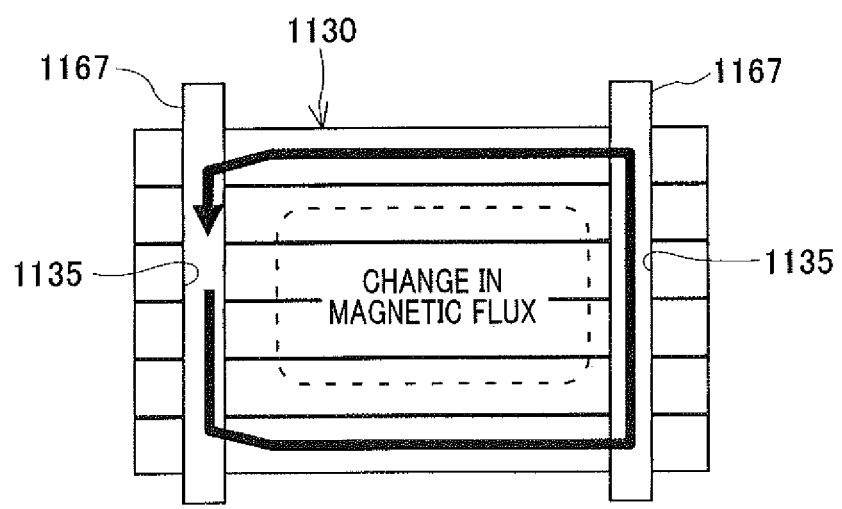
FIG. 27 is an explanatory diagram of a state in which an eddy current is generated when a bus bar is attached by the attachment pins in the bus bar being pressed into the attachment holes in the stator core that is composed of laminated steel plates.

Instead of those according to the third embodiment and in the fourth variation example, above, the shapes of the attachment hole 135 and the attachment pin 167 may be formed as in a fifth variation example shown in FIG. 26. In other words, in the fifth variation example, the cross-sectional shape of an attachment hole 135B is formed into an equilateral triangle, and the cross-sectional shape of the attachment pin 167 is formed into a circle of a size enabling a portion of the attachment pin 167 in the circumferential direction to be pressed against the wall surface of the attachment hole 135B.

In the fifth variation example as well, workings and effects similar to those according to the third embodiment can be achieved. Although not shown in the drawings, the relationship between the cross-sectional shapes of the attachment hole 135B and the attachment pin 167 may be reversed in the fifth variation example as well.

Fourth Embodiment

Figure 28:
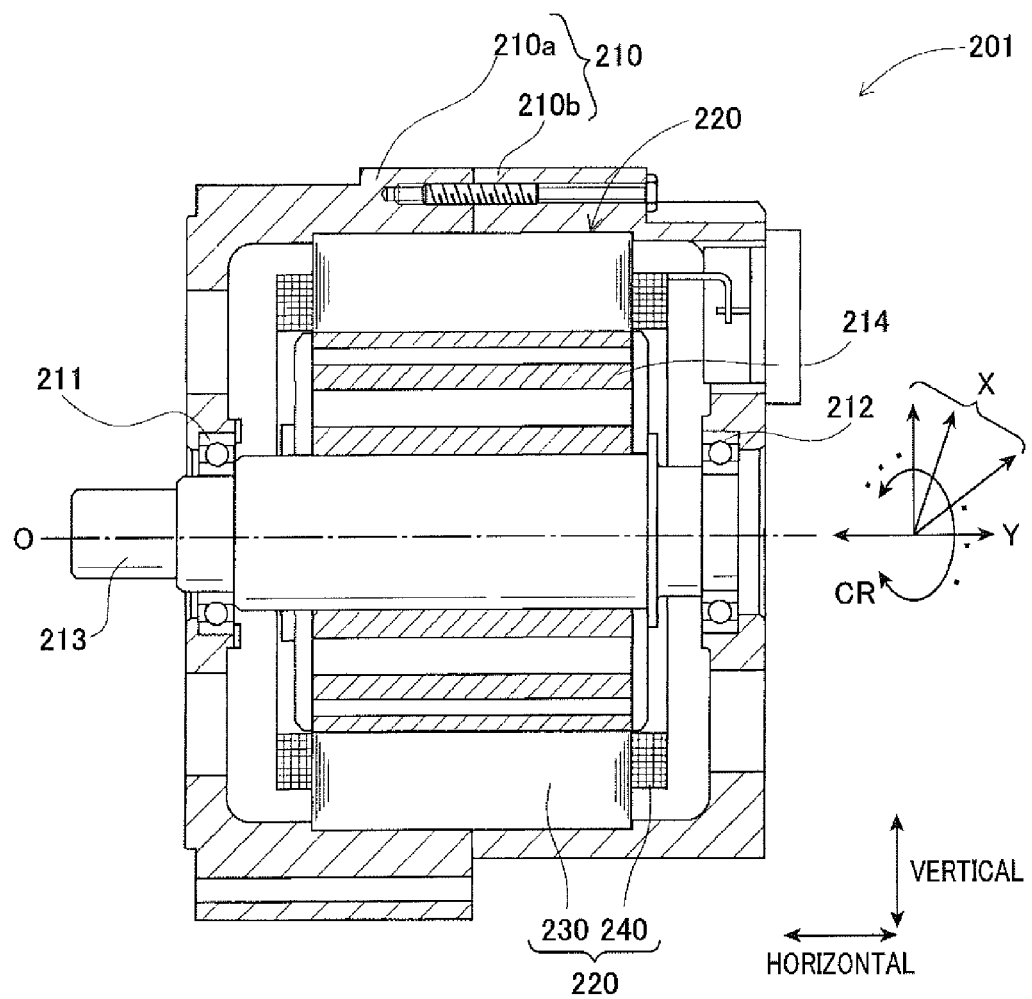
FIG. 28 is an axial-direction cross-sectional view of a rotating electric machine in which a stator is mounted according to a fourth embodiment.

FIG. 28 shows a rotating electric machine 201 in which a stator 220 according to the present embodiment is mounted. This rotating electric machine 201 is used as an electric motor for a vehicle. As shown in FIG. 28, the rotating electric machine 201 includes a housing 210 that is composed by a pair of bottomed tube-shaped housing members 210a and 210b being joined together at respective opening portions, a rotating shaft 213 that is supported so as to rotate freely in the housing 210 by bearings 211 and 212, a rotor 214 that is fitted onto the outer circumference of the rotating shaft 213 and fixed thereto, and a stator 220 that is disposed so as to oppose the rotor 214 in a radial direction X of the rotating electric machine 201 on the outer side of the rotor 214.

The rotor 214 has a plurality of magnetic poles disposed on the outer circumferential side opposing the inner circumferential side of the stator 220 in the radial direction X, so as to be spaced apart by a predetermined distance in the circumferential direction and such that the polarities alternately differ in the circumferential direction. These magnetic poles are formed by a plurality of pairs of permanent magnets 215 (see FIG. 35) that are disposed in V-shapes in predetermined positions in the rotor 214. Two permanent magnets 215 form a single pair, and each pair forms a single magnetic pole. The number of magnetic poles in the rotor 214 is not limited because the quantity differs depending on rotating electric machine. According to the present embodiment, a rotor having eight poles (four N poles and four S poles) is used.

Figure 30:
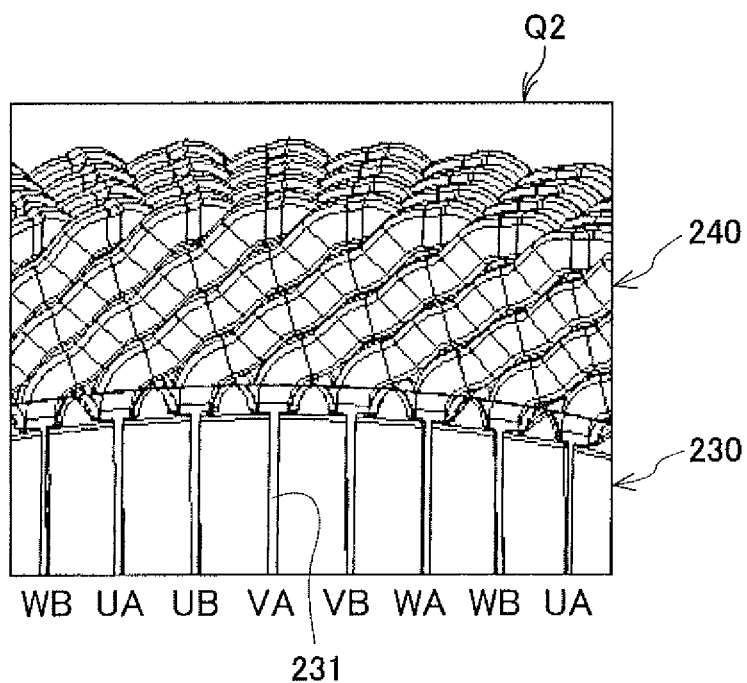
FIG. 30 is an enlarged view of section Q in FIG. 29.

Next, the stator 220 will be described with reference to FIGS. 29 to 35. As shown in FIGS. 29 and 30, the stator 220 includes an annular stator core 230 that has a plurality of slots 231 in the circumferential direction, a stator winding 240 composed of phase windings 241U, 241V, and 241W of three phases (U-phase, V-phase, and W-phase) of differing electrical phases that are wound around the slots 231 of the stator core 230, and a module 260 that is attached to the stator core 230 and has three heat releasing members 261U, 261V, and 261W that electrically connect the respective phase windings 241U, 241V, and 241W to an inverter that serves as an external apparatus (not shown).

The stator core 230 is an integrated type that is formed by a plurality of annular electromagnetic steel plates being laminated in an axial direction Y of the stator core 230. The stator core 230 is composed of an annular back core 233 and a plurality of teeth 234 that project from the back core 233 towards the inward radial direction and are arrayed so as to be spaced apart by a predetermined distance in the circumferential direction. Each slot 231 is formed between adjacent teeth 234 (see FIG. 31). The number of slots 231 formed in the stator core 230 is set such that two slots 231 are formed for each phase of the winding 240, for each magnetic pole (eight poles) of the rotor 214. In the present embodiment, based on 8×3×2=48, 48 slots are provided. In other words, the 48 slots 231 are composed of U-phase slots UA and UB, V-phase slots VA and VB, and W-phase slots WA and WB that are sequentially and repeatedly arranged in twos in the circumferential direction (see FIG. 30). The slot multiple is set to 2.

Figure 32:
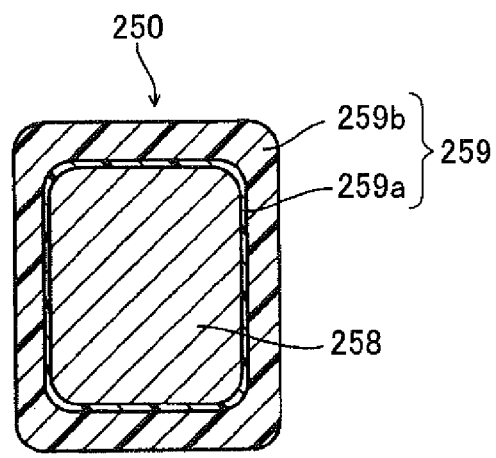
FIG. 32 is a cross-sectional view of a conductor segment configuring a stator winding according to the fourth embodiment.

The stator winding 240 is configured by a plurality of U-shaped conductor segments 250 being joined together by welding at the end portions on the open end side. As shown in FIG. 32, the conductor segment 250 is formed by a flat (rectangular) conducting wire, composed of a conductor 258 having a rectangular cross-section and an insulating film 259 that has an inner layer 259a and an outer layer 259b and covers the outer periphery of the conductor 258, being bent into a U shape.

Figure 31:
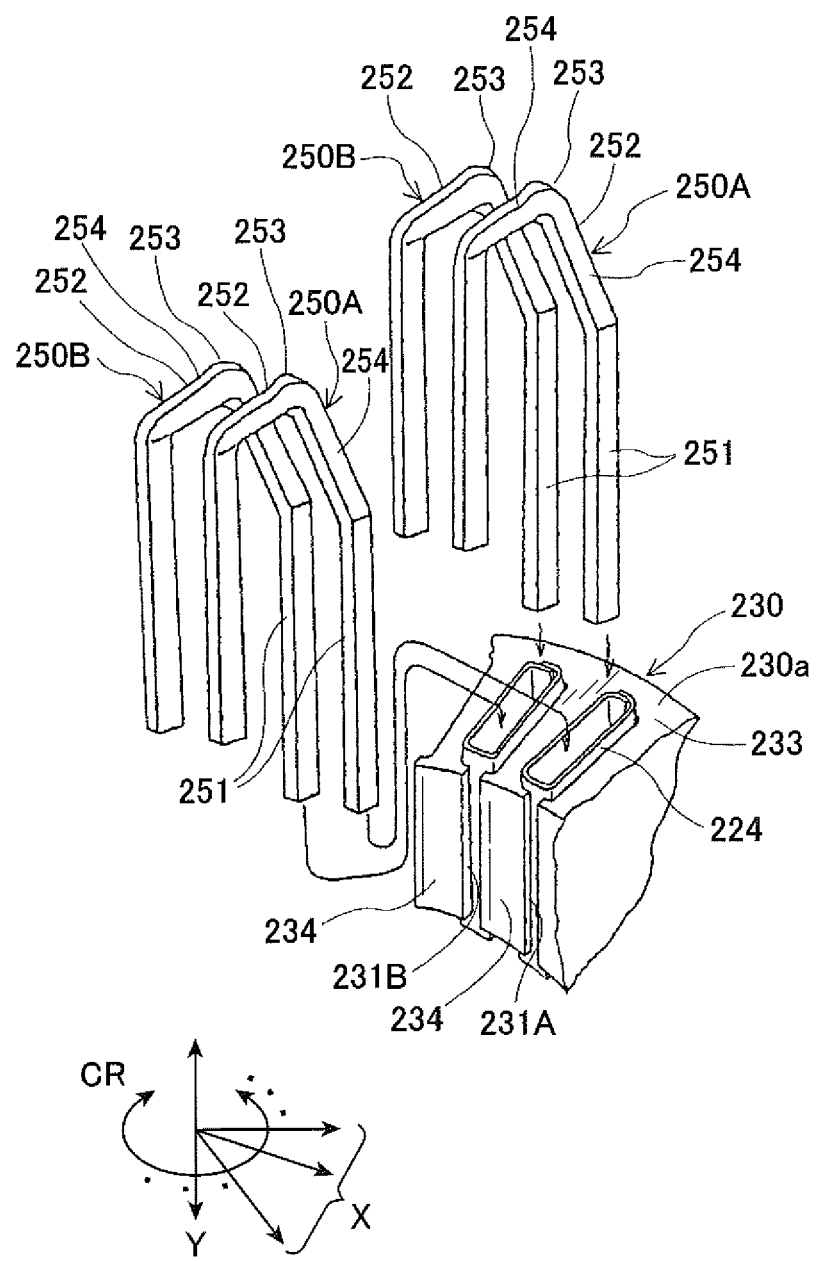
FIG. 31 is an explanatory diagram of a state in which conductor segments are inserted into the slots of a stator core according to the fourth embodiment.

As shown in FIG. 31, the conductor segment 250, which is formed into a U-shape, is composed of a pair of straight portions 251 and 251 that are parallel to each other and a turn portion 252 that connects together one end of each straight portion 251 and 251. A top stepped portion 253 that extends along an end surface 230a of the stator core 230 is provided in the center portion of the turn portion 252. On both sides of the top stepped portion 253, sloped portions 254 that slope at a predetermined angle in relation to the end surface 230a of the stator core 230 are provided. An insulator 224 provides electrical insulation between the stator core 230 and the stator winding 240.

FIG. 31 shows two conductor segments 250A and 250B that form a pair and are disposed so as to be inserted into two slots 231A and 231B that are adjacent to each other and are of the same phase. In this case, the pair of straight portions 251 and 251 of each of the two conductor segments 250A and 250B is inserted separately into the two adjacent slots 231A and 231B from one axial-direction end side (upper side in FIG. 31), rather than being inserted into the same slot 231. In other words, one straight portion 251 of one conductor segment 250A, of the two conductor segments 250A and 250B on the right side in FIG. 31, is inserted into the outermost layer (eighth layer) of one slot 231A, and the other straight portion 251 is inserted into a seventh layer of another slot (not shown) that is apart from the slot 231A by a single magnetic pole pitch (NS pole pitch) in the counter-clockwise direction of the stator core 230.

Then, one straight portion 251 of the other conductor segment 250B is inserted into the outermost layer (eighth layer) of the slot 231B adjacent to the slot 231A, and the other straight portion 251 is inserted into the seventh layer of another slot (not shown) that is apart from the slot 231B by a single magnetic pole pitch (NS pole pitch) in the counter-clockwise direction of the stator core 230. In other words, the two conductor segments 250A and 250B are disposed so as to be shifted by a single slot pitch in the circumferential direction. In this way, the straight portions 251 of an even number of conductor segments 250 are disposed so as to be inserted into all of the slots 231.

According to the present embodiment, a total of eight straight portions 251 are housed in each slot 231 so as to be arrayed in a single row in the radial direction X.

The open end portions of the pair of straight portions 251 and 251 that extend from the slots 231 towards the other axial-direction end side (lower side in FIG. 31) are twisted to opposite sides in a circumstantial direction CR of the rotating electric machine 201, so as to run diagonally at a predetermined angle on the end surface 30a of the stator core 230, thereby forming diagonal portions 255 (see FIG. 29), each having a length that is substantially half the magnetic pole pitch.

Then, on the other axial-direction end side of the stator core 230, the terminals of predetermined diagonal portions 255 of the conductor segments 250 are joined together by welding or the like, and electrically connected in a predetermined pattern. In other words, as a result of the predetermined conductor segments 250 being serially connected, the stator winding 240 having three phase windings 241U, 241V, and 241W that are wound by wave winding in the circumferential direction along the slots 231 of the stator core 230 is formed. For each phase of the stator winding 40, a winding (coil) that makes eight circuits in the circumferential direction of the stator core 230 is formed by the basic U-shaped conductor segments 250. However, for each phase of the stator winding 240, the segments connected to an output lead line and a neutral point lead line, as well as segments having a turn portion that connects the first circuit and the second circuit, . . . and the seventh circuit and the eighth circuit are each composed of an irregular-shaped segment (not shown) that differs from the basic conductor segment 250.

Figure 33:
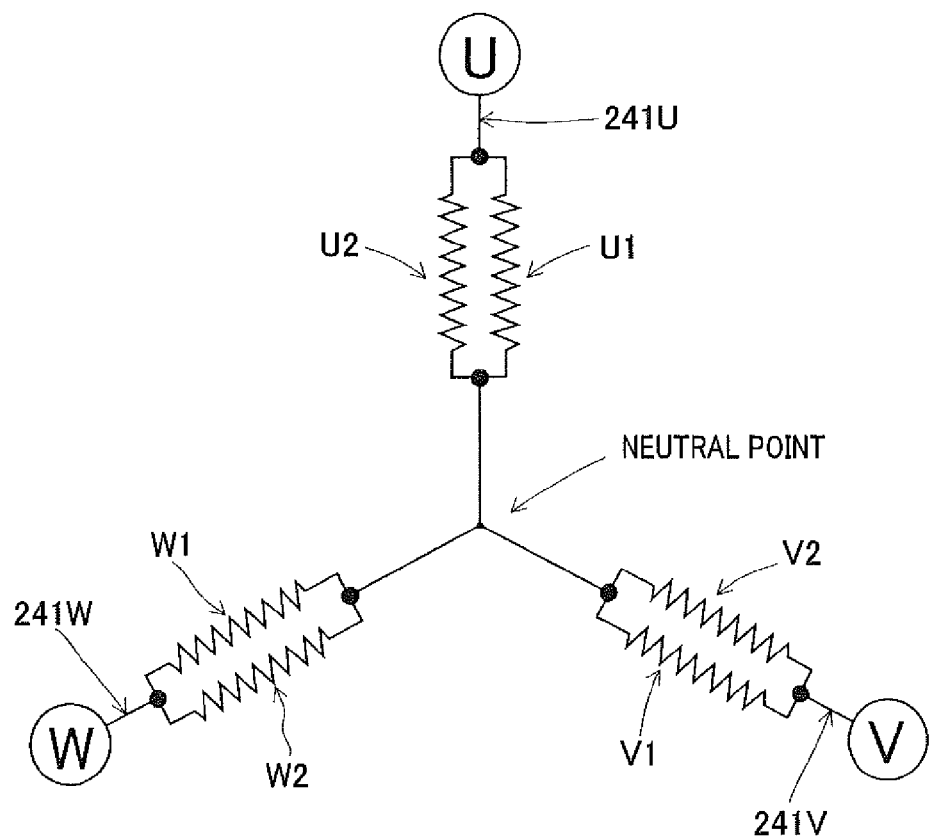
FIG. 33 is a connection wiring diagram of the stator winding according to the fourth embodiment.

As shown in FIG. 33, the winding end of each phase winding 241U, 241V, and 241W of the stator winding 240 is connected by a Y-connection using these irregular-shaped segments. According to the present embodiment, the phase windings 241U, 241V, and 241W are respectively composed of two parallel windings U1 and U2, V1 and V2, and W1 and W2, each of which are connected in parallel.

On the one axial-direction end side of the stator winding 240 that is wound around the stator core 230 as described above, a first coil end portion 240a (see FIG. 29) that has an overall ring shape is formed by the plurality of turn portions 252 projecting outwards from the end surface 230a on the one axial-direction end side of the stator core 230. In addition, on the other axial-direction end side of the stator winding 240, a second coil end portion 240b (see FIG. 29) that has an overall ring shape is formed by the plurality of diagonal portions 255 and joined portions projecting outside the slots 231 from the end surface 230b on the other axial-direction end side of the stator core 230.

The stator winding 240 is wound by "distributed winding" in which the phase windings 241U, 241V, and 241W are wound so as to be distributed among a plurality of slots 231, rather than being concentrated in a single slot 231. Therefore, in the first and second coil end portions 240a and 240b, the phase windings 241U, 241V, and 241W that extend outward in the axial direction Y from adjacent slots 231 are in a state in which the respective planar outer peripheral surfaces are close to and opposing those of the other phase windings 241U, 241V, and 241W having differing electrical phases. As a result, high interphase insulation is required.

Figure 34:
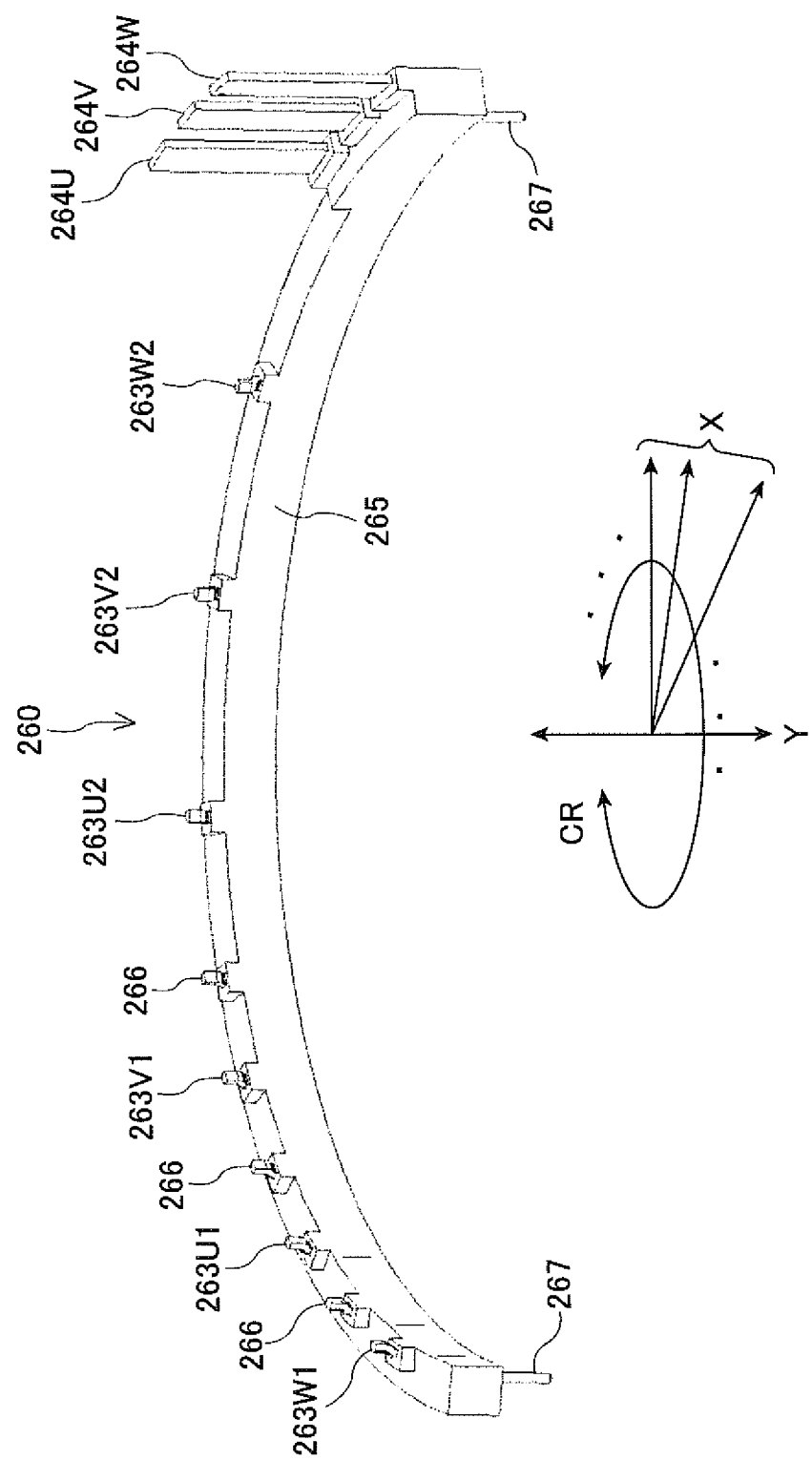
FIG. 34 is a perspective view of a module according to the fourth embodiment.
Figure 35:
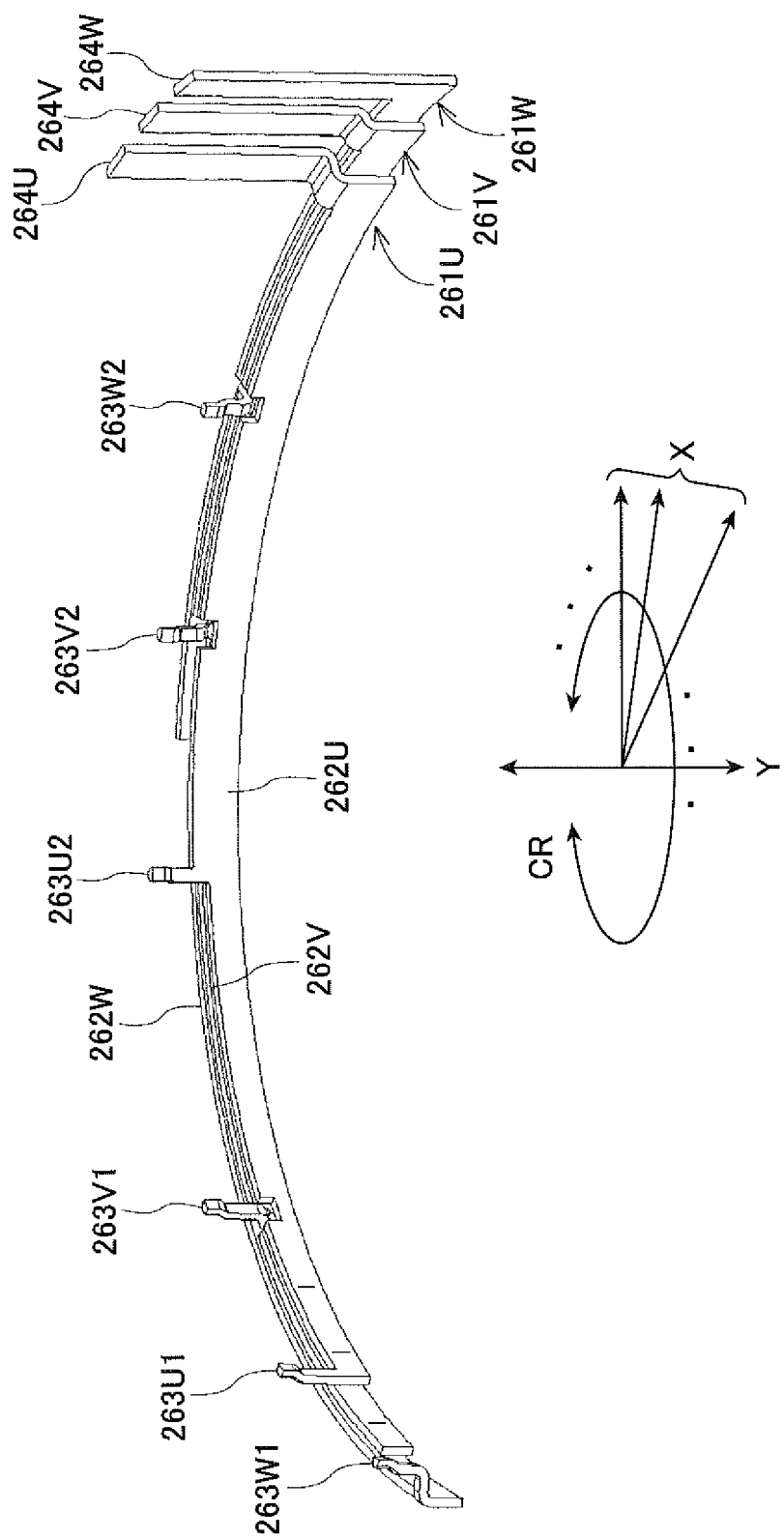
FIG. 35 is a perspective view of three heat releasing members according to the fourth embodiment.

As shown in FIG. 34, the module 260 is formed into a circular arc shape and is integrated with the three heat releasing members, first to third heat releasing members 261U, 261V, and 261W, the neutral line bus bar (not shown), and the two attachment pins 267 being integrally molded with a resin (fixing member) 265. The module 60 is shaped into a circular arc that follows the circular ring shape of the back core 233 of the stator core 230. As shown in FIG. 35, in the module 260, the first to third heat releasing members 261U, 261V, and 261W are disposed in a state of non-contact with one another, in sequence from the inner circumferential side towards the outer circumferential side.

The first to third heat releasing members 261U, 261V, and 261W electrically connect the phase windings 241U, 241V, and 241W, respectively, to an inverter (not shown) that serves as an external apparatus. The first to third heat releasing members 261U, 261V, and 261W respectively have two branch portions 263U1 and 263U2, 263V1 and 263V2, and 263W1 and 263W2, and a single trunk portion 262U, 262V, and 262W that electrically connects together the two branch portions 263U 1 and 263U2, 263V1 and 263V2, and 263W1 and 263W2.

A terminal portion 264U that is connected to the inverter is provided in one longitudinal-direction end portion (right end portion in FIG. 35) of the trunk portion 262U of the first heat releasing member 261U. In addition, the two branch portions, first and second branch portions 263U1 and 263U2, that are connected to the two parallel windings U1 and U2 of the U-phase winding 241U are provided in the other longitudinal-direction end portion (left end portion in FIG. 35) and the center portion of the trunk portion 262U. The trunk portion 262U of the first heat releasing member 261U is formed into a circular arc shape that extends along the ring shape of the back core 233 from the terminal portion 264U in the one longitudinal-direction end portion to the first branch portion 263U1 in the other longitudinal-direction end portion.

In addition, in a manner similar to the first heat releasing member 261U, the second heat releasing member 261V is provided with a terminal portion 264V that is connected to the inverter, and two branch portions, first and second branched portions 263V 1 and 263V2, that are connected to the two parallel windings V1 and V2 of the V-phase winding 241V. The trunk portion 262V of the second heat releasing member 261V is formed into a circular arc shape that extends along the ring shape of the back core 233 from the terminal portion 64V in the one longitudinal-direction end portion to the first branch portion 263V1 in the other longitudinal-direction end portion.

Furthermore, in a manner similar to the first heat releasing member 261U, the third beat releasing member 261W is provided with a terminal portion 264W that is connected to the inverter, and two branch portions, first and second branched portions 263W1 and 263W2, that are connected to the two parallel windings W1 and W2 of the W-phase winding 241W. The trunk portion 62W of the third heat releasing member 261W is formed into a circular arc shape that extends along the ring shape of the back core 233 from the terminal portion 264W in the one longitudinal-direction end portion to the first branch portion 263W 1 in the other longitudinal-direction end portion.

The neutral line bus bar (not shown) has three output terminals 266. As shown in FIG. 34, the tip portions of the three output terminals 266 are exposed from predetermined positions in the bus bar module 260.

In addition, two metal attachment pins 267 are provided in both longitudinal-direction end portions of the bus bar module 260. The bus bar module 260 is attached to the stator core 230 by the two attachment pins 267 being respectively pressed into two attachment holes 235 provided on the one axial-direction end surface of the back core 233 of the stator core 230 (upper end surface in FIG. 29) so as to be separated in the circumferential direction. In other words, the first to third heat releasing members 261U, 261V, and 261W provided within the module 260 are positioned on the outer circumferential side of the first coil end portion 240a and are disposed so as to extend in a circular arc shape along the ring shape of the back core 233.

In the stator core 230 according to the present embodiment, configured as described above, the end portions of the phase windings 241U, 241V, and 241W are respectively electrically connected to the first to third heat releasing members 261U, 261V, and 261W that have conductivity. As a result, when the stator winding 240 generates heat as a result of being energized, the first to third heat releasing members 261U, 261V, and 261W draw the heat from the phase windings 241U, 241V, and 241W and release the heat outside, thereby lowering the temperatures of the phase windings 241U, 241V, and 241W. As a result, the occurrence of insulation defects caused by thermal degradation and abnormal heat generation in the insulating films 259 of the conductor segments 250 configuring the phase windings 241U, 241V, and 241W can be prevented.

In particular, in a Y-connection, the electrical potential increases towards the entries of the phase windings 241U, 241V, and 241W, and insulation becomes important. However, according to the present embodiment, the sections closer to the entries of the phase windings 241U, 241V, and 241W become closer to the first to third heat releasing members 261U, 261V, and 261W, and heat releasability can be improved. Therefore, the occurrence of insulation defects caused by thermal degradation and abnormal heat generation can be prevented with further certainty.

In addition, the phase windings 241U, 241V, and 241W are respectively configured by two parallel windings U1 and U2, V1 and V2, and W1 and W2, each of which are connected in parallel. Therefore, the surface areas of the phase windings 241U, 241V, and 241W can be increased, and heat releasability can be improved. As a result, the occurrence of insulation defects can be prevented with further certainty.

In addition, the first to third heat releasing members 261U, 261V, and 261W according to the present embodiment are each formed into a circular arc shape that extends from an end portion on the power input side (terminal portions 264U, 264V, and 264W) towards the end portion on the side connected to the respective phase windings 241U, 241V, and 241W that is positioned separated from the end portion on the power input side in the circumferential direction. Therefore, the first to third heat releasing members 261U, 261V, and 261W become larger in the circumferential direction, and surface area can be increased. As a result, heat releasability can be improved.

In addition, the first to third heat releasing members 261U, 261V, and 261W according to the present embodiment are disposed so as to extend in a circular arc shape on the outer circumferential side of the first coil end portion 240a of the stator winding 240. Therefore, compared to when the first to third heat releasing members 261U, 261V, and 261W are disposed on the first coil end portion 240a, the radius R of the circular arc of each of the first to third heat releasing members 261U, 261V, and 261W is increased, and the circumferential direction length can be extended. As a result, surface area can be increased, and heat releasability can be improved.

In addition, the first to third heat releasing members 261U, 261V, and 261W according to the present embodiment are integrated by being integrally molded with the resin (fixing member) 265, and are thereby fixed to one another. Therefore, variations in heat releasability caused by differences in the manner of contact with a cooling liquid among the first to third heat releasing members 261U, 261V, and 261W can be suppressed. As a result, temperature rise can be stably suppressed throughout the three phase windings 241U, 241V, and 241W.

Sixth Variation Example

Figure 36:
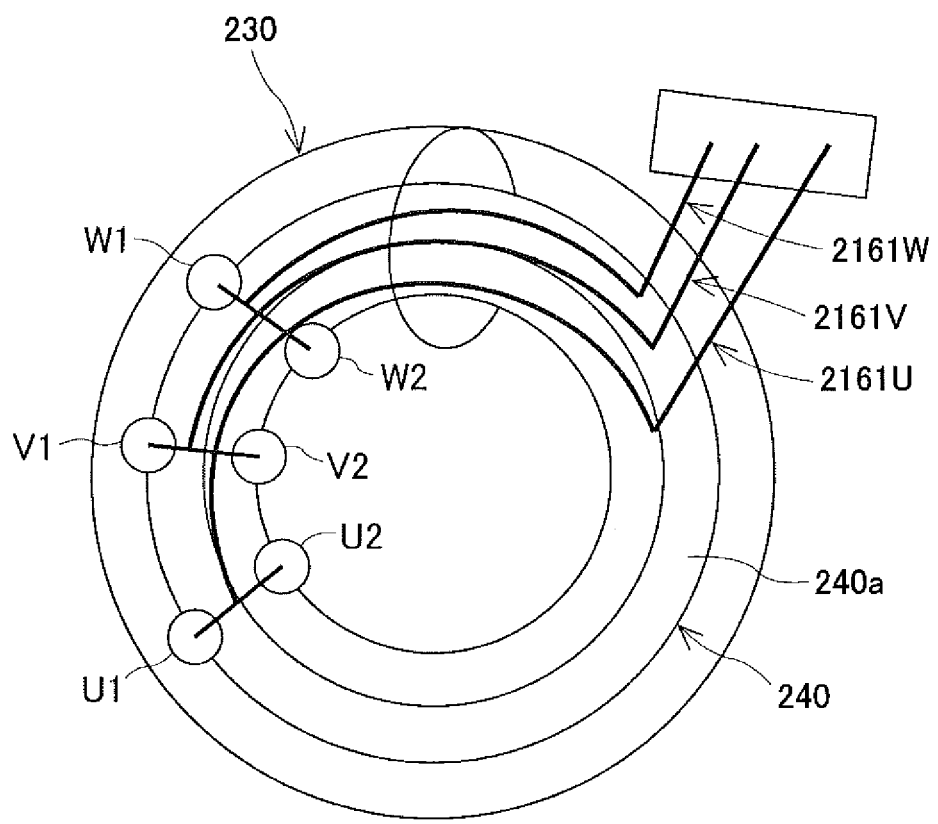
FIG. 36 is an explanatory diagram that schematically shows the stator to which the heat releasing members are attached in a sixth variation example.

According to the above-described fourth embodiment, the first to third heat releasing members 261U, 261V, and 261W are integrated by being integrally molded with the resin (fixing member) 265, and are thereby fixed to one another. However, as shown in FIG. 36, the first to third heat releasing members 261U, 261V, and 261W are not necessarily required to be fixed to one another by the fixing member 265 or the like. In this case, first to third heat releasing members 2161U, 2161V, and 2161W are each formed by a flat (rectangular) conducting wire that is composed of the conductor 258 having a rectangular cross-section and the insulating film 259 that has the inner layer 259a and the outer layer 259b and covers the outer periphery of the conductor 258, as shown in FIG. 32, for example.

The first heat releasing member 2161U is connected to the end portions of the parallel windings U1 and U2 of the U-phase winding 241U. The second heat releasing member 2161V is connected to the end portions of the parallel windings V1 and V2 of the V-phase winding 241V. The third heat releasing member 2161W is connected to the end portions of the parallel windings W1 and W2 of the W-phase winding 241W. The first to third heat releasing members 2161U to 2161W are disposed so as to extend in the circumferential direction on the first coil end portion 240a.

In the sixth variation example, the surfaces of the first to third heat releasing members 2161U, 2161V, and 2161W are exposed to air. Therefore, the heat drawn from the phase windings 241U, 241V, and 241W are released into the air from the surfaces of the first to third heat releasing members 2161U, 2161V, and 2161W.

Fifth Embodiment

Figure 37:
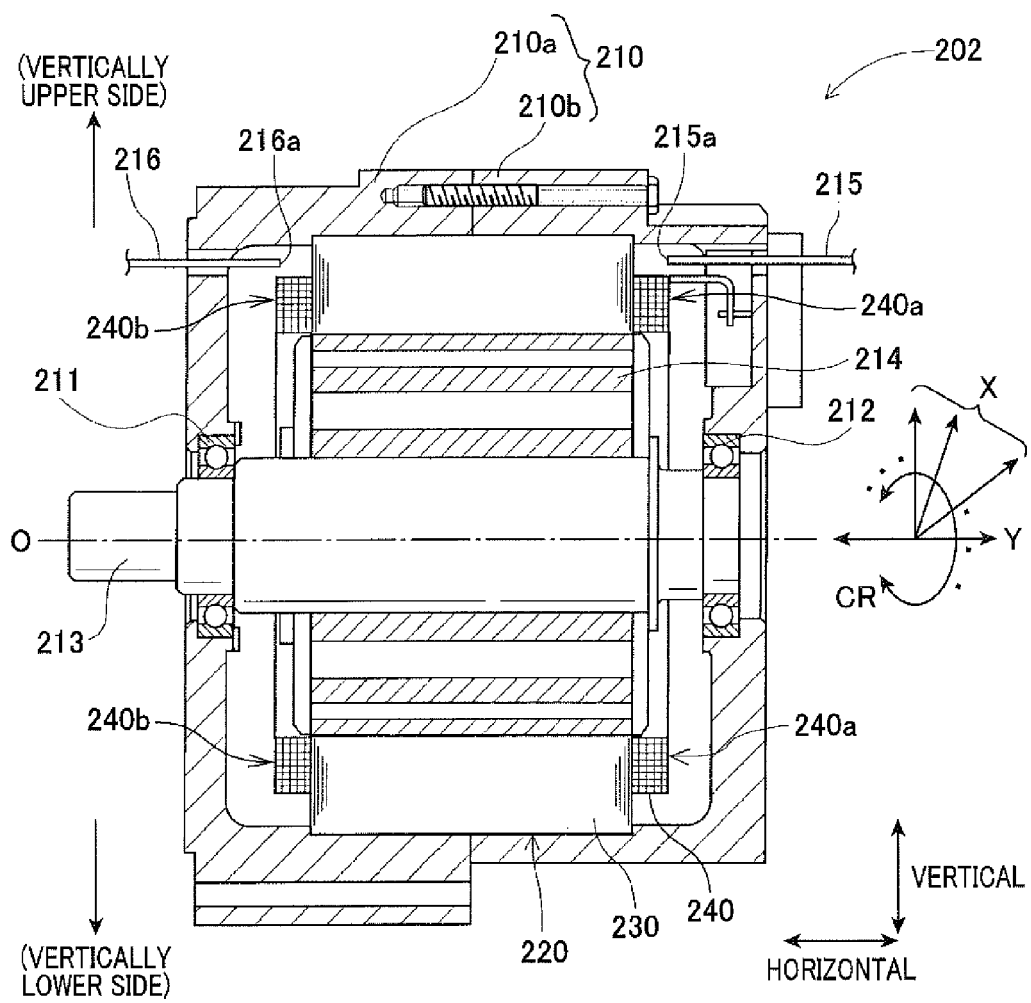
FIG. 37 is an axial-direction cross-sectional view of a rotating electric machine in which a stator is mounted according to a fifth embodiment.

FIG. 37 shows a rotating electric machine 202 in which a stator 220 according to a fifth embodiment is mounted. This rotating electric machine 202 is provided with a cooling liquid supplying means (not shown) that supplies a stator winding 240 with a cooling liquid, thereby cooling the stator winding 240.

The rotating electric machine 202 according to the fifth embodiment differs from that according to the fourth embodiment in that the above-described cooling liquid supplying means is provided, and regarding the configurations of three heat releasing members 2261U, 2261V, and 2261W that electrically connect phase windings 241U, 241V, and 241W, respectively, to an inverter (not shown) that serves as an external apparatus. Therefore, members and configurations that are shared with the fourth embodiment are given the same reference numbers, and detailed descriptions thereof are omitted. Differences and important features will hereinafter be described.

The cooling liquid supplying means that is mounted in the rotating electric machine 202 according to the fifth embodiment includes a pair of conduits 215 and 216 that supply a cooling liquid to the stator winding 240. The pair of conduits 215 and 216 are respectively attached so as to pass through the housing members 210a and 210b, so as to communicate between the interior and exterior of the housing 210. The respective tip portions of the conduits 215 and 216 are provided with discharge openings 215a and 216a that discharge the cooling liquid. The discharge openings 215a and 216a respectively open vertically above first and second coil end portions 240a and 240b of the stator winding 240 that is housed within the housing 210.

In the rotating electric machine 202, a recovering means (not shown) for recovering the cooling liquid discharged from the discharge openings 215a and 216a onto the first and second coil end portions 240a and 240b and circulating the cooling liquid so as to be discharged again from the discharge openings 215a and 216a, a cooler (not shown) that cools the heated cooling liquid, and the like are provided midway on a circulation route. These components configure a cooling apparatus that cools the stator winding 240 (stator 220). According to the present embodiment, automatic transmission fluid (ATF) is used as the cooling liquid. However, a publicly known liquid coolant that is conventionally used in rotating electric machines may also be used.

The first to third heat releasing members 2261U, 2261V, and 2261W according to the fifth embodiment are the same as the heat releasing members in the sixth variation example in tee us of not being fixed to one another by a fixing member or the like, and each being formed by a flat (rectangular) conducting wire composed of a conductor 58 having a rectangular cross-section, and an insulating film 259, as shown in FIG. 32.

In addition, the first to third heat releasing members 2261U, 2261V, and 2261W according to the fifth embodiment and the first to third heat releasing members 2161U, 2161V, and 2161W in the sixth variation example are the same in terms of each being formed so as to extend in a circular arc shape from the end portion on the power input portion side to the end portion on the side connected to the respective phase windings 241U, 241V, and 241W that is positioned separated from the end portion on the power input portion side in the circumferential direction.

Figure 38:
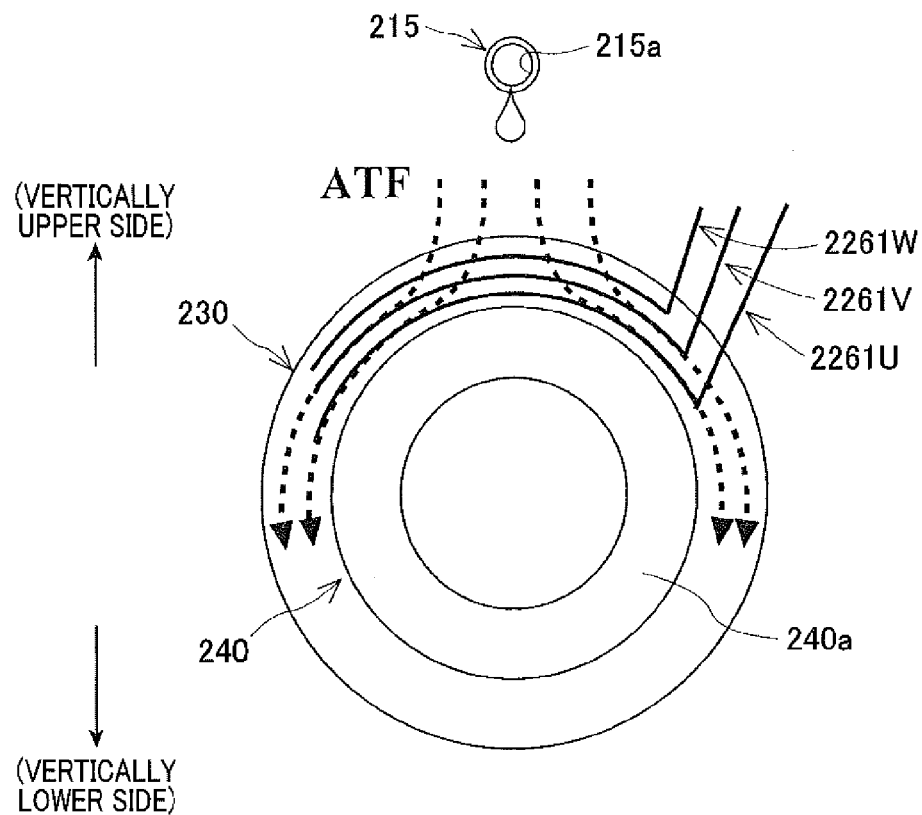
FIG. 38 is an explanatory diagram of a state in which a cooling liquid is supplied to a coil end portion, viewed from the axial direction, according to the fifth embodiment.
Figure 39:
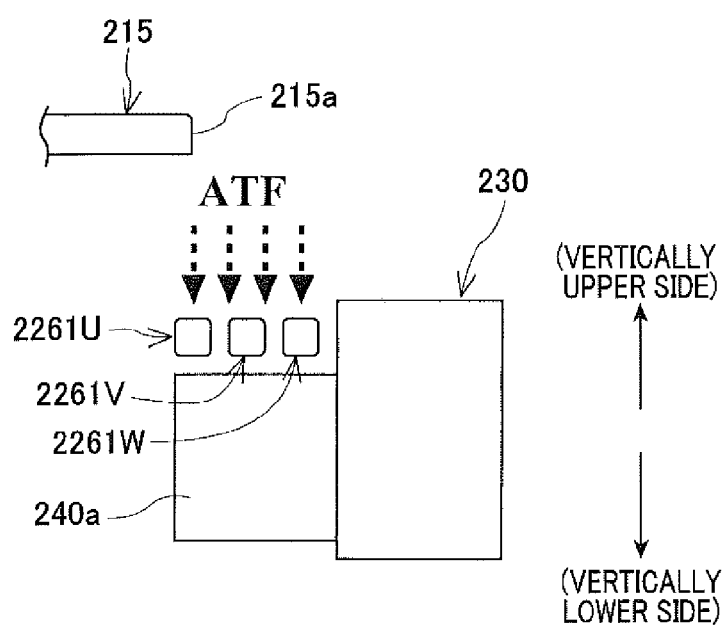
FIG. 39 is an explanatory diagram of a state in which the cooling liquid is supplied to the coil end portion, viewed from a direction perpendicular to the axis, according to the fifth embodiment.

However, whereas, in the sixth variation example, the first to third heat releasing members 2161U, 2161V, and 2161W are disposed in a state extending in the circumferential direction on the first coil end portion 240a, the first to third heat releasing members 2261U, 2261V, and 2261W according to the fifth embodiment differs in that first to third heat releasing members 2261U, 2261V, and 2261W are disposed so as to extend in a circular arc shape on the outer circumferential side of the first coil end portion 240a. In other words, the first to third heat releasing members 2261U, 2261V, and 2261W according to the fifth embodiment are disposed along the outer circumferential surface vertically above the first coil end portion 240a. As a result, as shown in FIGS. 38 and 39, the cooling liquid (ATF) discharged from the discharge opening 215a of the conduit 215 onto a vertically upper portion of the first coil end portion 240a cools both the first coil end portion 240a and the first to third heat releasing members 2261U, 2261V, and 2261W.

In the stator core 220 according to the fifth embodiment, configured as described above, the end portions of the phase windings 241U, 241V, and 241W are respectively electrically connected to the first to third heat releasing members 2261U, 2261V, and 2261W that have conductivity. Therefore, workings and effects similar to those according to the fourth embodiment, that is, enabling prevention of the occurrence of insulation defects caused by thermal degradation and abnormal heat generation in the insulating films 259 of the conductor segments 250 configuring the phase windings 241U, 241V and 241W, and the like can be achieved.

In particular, according to the fifth embodiment, the first to third heat releasing members 2261U, 2261V, and 2261W are disposed along the outer circumferential surface vertically above the first coil end portion 240a. Therefore, the cooling liquid (ATF) discharged from the discharge opening 215a of the conduit 215 onto the vertically upper of the first coil end portion 240a can cool both the first coil end portion 40a and the first to third heat releasing members 2261U, 2261V, and 2261W. As a result, the cooling efficiency of the first to third heat releasing members 2261U, 2261V, and 2261W can be improved.

Seventh Variation Example

Figure 40:
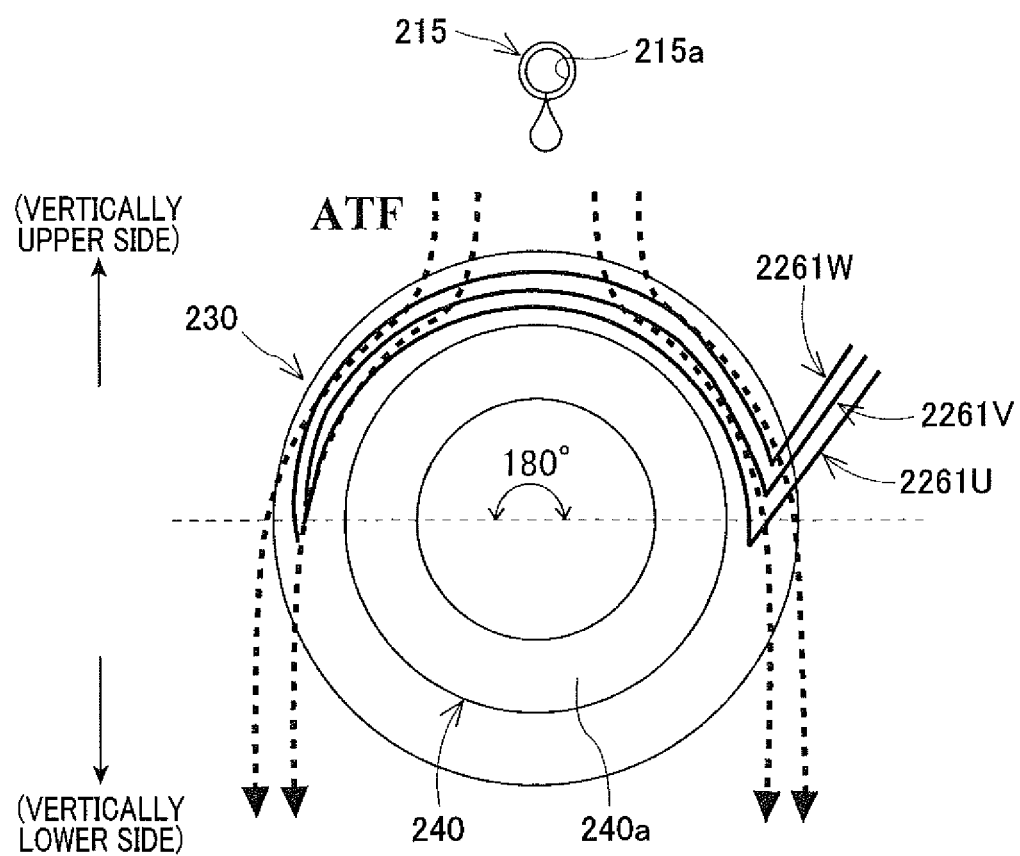
FIG. 40 is an explanatory diagram of an attachment state of the heat releasing members in a seventh variation example.

According to the above-described fifth embodiment, the first to third heat releasing members 2261U, 2261V, and 2261W that are disposed along the outer circumferential surface vertically above the first coil end portion 240a are preferably disposed so as to cover an area that is 180° or more in the circumferential direction CR, on the vertically upper side of the first coil end portion 240a, as in a seventh variation example shown in FIG. 40. As a result, the cooling efficiency of the first to third heat releasing members 2261U, 2261V, and 2261W can be further improved.

Eighth Variation Example

Figure 41:
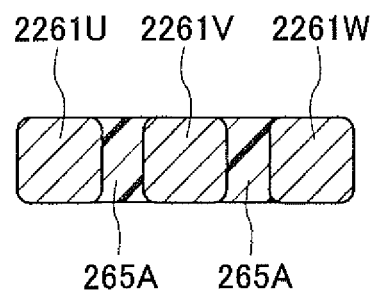
FIG. 41 is a cross-sectional view of the heat releasing members in an eighth variation example.

The first to third heat releasing members 2261U, 2261V, and 2261W according to the above-described fifth embodiment are not fixed to one another by a fixing member or the like. However, as in an eighth variation example shown in FIG. 41, the first to third heat releasing members 2261U, 2261V, and 2261W may be fixed to one another by a varnish 265A. As a result, variations in heat releasability caused by differences in the manner of contact with the cooling liquid among the first to third heat releasing members 2261U, 2261V, and 2261W can be suppressed. Temperature rise can thereby be stably suppressed throughout the three phase windings 241U, 241V, and 241W.

Ninth Variation Example

Figure 42:
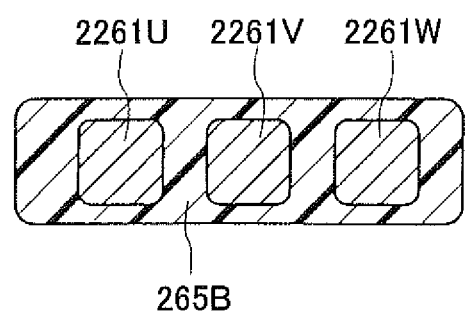
FIG. 42 is a cross-sectional view of the heat releasing members in a ninth variation example.

As in a ninth variation example shown in FIG. 42, the first to third heat releasing members 2261U, 2261V, and 2261W may be integrated with a molding resin 265B, and thereby fixed to one another. In the ninth variation example as well, variations in heat releasability caused by differences in the manner of contact with the cooling liquid among the first to third heat releasing members 2261U, 2261V, and 2261W can be suppressed. Temperature rise can thereby be stably suppressed throughout the three phase windings 241U, 241V, and 241W.

Tenth Variation Example

Figure 43:
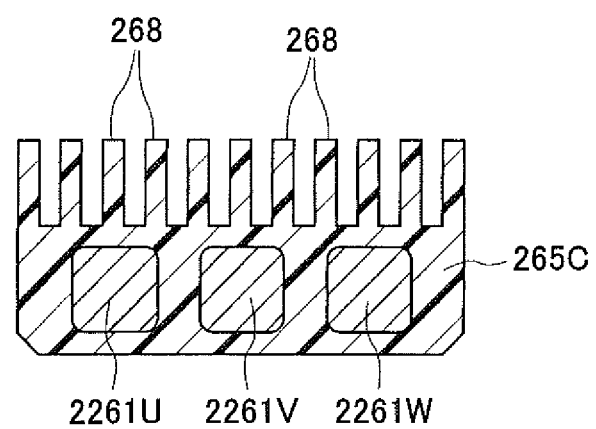
FIG. 43 is a cross-sectional view of the heat releasing members in a tenth variation example.

As in a tenth variation example shown in FIG. 43, a molding resin 265C that fixes the first to third heat releasing members 2261U, 2261V, and 2261W to one another may be provided with numerous fins 268, thereby increasing surface area. As a result, the cooling efficiency of the first to third heat releasing members 2261U, 2261V, and 2261W can be further improved.

OTHER EMBODIMENTS

The present disclosure is not limited to the above-described first to fifth embodiments and first to tenth variation examples. Various modifications can be made without departing from the spirit of the present disclosure.

For example, according to the above-described first to fifth embodiments and in the above-described first to tenth variation examples, an example is described in which the stator of a rotating electric machine of the present disclosure is applied to an electric motor for a vehicle. However, the present disclosure can also be applied to a power generator or an electric motor that serves as a rotating electric machine that is mounted in a vehicle, or a rotating electric machine that can be selectively used as both the electric motor and the power generator.

What is claimed is:

1. A stator of a rotating electric machine including:
an annular stator core that has a plurality of slots composed of U-phase slots, V-phase slots, and W-phase slots that are sequentially and repeatedly arranged in a circumferential direction of the rotating electric machine;
a stator winding that is composed of phase windings of three of respective phases that are housed in the slots and wound around the stator core; and
three phase bus bars that electrically connect the respective phase windings to an external apparatus, wherein:
each of the phase windings are configured by a plurality of parallel windings, each of which are connected in parallel; and
the phase bus bars are integrated with a fixing member to form a bus bar module (60, 70), and each of the phase bus bars include:
a plurality of branch portions that are electrically connected to the respective phase windings; and
a trunk portion that electrically connects together the branch portions, the trunk portion being configured such that a cross-sectional area of an end portion closest to the phase winding is smaller than a cross-sectional area of an end portion closest to the external apparatus.

2. The stator according to claim 1, wherein:
each of the phase windings includes an n (n being a natural number of 2 or more) parallel windings, each of which are connected in parallel; and
the trunk portion of each of the phase bus bars is configured such that a cross-sectional area decreases in steps of 1/n (½ when n=2) from the side closest to the external apparatus.

3. A stator of a rotating electric machine comprising:
a stator core that is formed by a plurality of annular steel plates being laminated in an axial direction of the rotating electric machine, and has a plurality of slots including U-phase slots, V-phase slots, and W-phase slots that are sequentially and repeatedly arranged in quantity n at a time (n being an integer of 2 or more) in a circumferential direction of the rotating electric machine;
a stator winding that includes phase windings of three of respective phases that are housed in the slots and wound around the stator core; and
a bus bar module that includes:
three phase bus bars that are electrically connected to the respective phase windings; and
a plurality of attachment pins that are respectively pressed into a plurality of attachment holes that are provided on one axial end surface of the stator core so as to be separated in the circumferential direction, the bus bar module being integrated with a fixing member, wherein:

when an angle formed by two slots that are adjacent to each other in the circumferential direction around an axial line of the stator core is θs, an angle θh formed by two attachment holes that are adjacent to each other in the circumferential direction around the axial line is determined by θh≈m (m being a positive integer)×6×n×θs.

4. The stator according to claim 3, wherein at least one of the attachment pins has a portion in the circumferential direction which is pressed against a wall surface of the attachment hole.

5. A stator of a rotating electric machine comprising:
a stator core that has a plurality of slots that are arrayed in a circumferential direction of the rotating electric machine; and
a stator winding that includes phase windings of three of differing electrical phases that are wound around the stator core by open end portions of conductor segments being inserted into the slots, the open end portions extending outward in an axial direction of the stator core from differing slots being twisted in the circumferential direction, and terminals of predetermined open end portions thereafter being connected to one another on one end side of the stator core, wherein:
the conductor segment has a conductor that has a rectangular cross-section and an insulating film that covers the outer peripheral surface of the conductor;
each of the phase windings are configured such that respective planar outer peripheral surfaces oppose those of other phase windings having differing electrical phases on at least one end side in the axial direction of the stator core, each of the phase windings including a plurality of parallel windings, each of which are connected in parallel, end portions of the phase windings being respectively electrically connected to heat releasing members that have conductivity.

6. The stator according to claim 5, wherein each of the heat releasing members are formed into a circular arc shape that extends from an end portion on a power input side towards an end portion on a side connected to the respective phase windings that is positioned separated from the end portion on the power input side in the circumferential direction.

7. The stator according to claim 5, wherein each of the heat releasing members are disposed so as to extend in a circular arc shape on an outer circumferential side of a coil end portion of the stator winding that projects outward from an end surface on an axial-direction end side of the stator core.

8. The stator according to claim 6, wherein each of the heat releasing members are disposed so as to extend in a circular arc shape on an outer circumferential side of a coil end portion (240*a*, 240*b*) of the stator winding that projects outward from an end surface on an axial-direction end side of the stator core.

9. The stator according to claim 7, wherein each of the heat releasing members are cooled together with the coil end portion by a cooling liquid discharged onto a vertically upper portion of the coil end portion.

10. The stator according to claim 8, wherein each of the heat releasing members are cooled together with the coil end portion by a cooling liquid discharged onto a vertically upper portion of the coil end portion.

11. The stator according to claim 9, wherein each of the heat releasing members are disposed so as to cover an area that is 180° or more in the circumferential direction on a vertically upper side of the coil end portion.

12. The stator according to claim 10, wherein each of the heat releasing members are disposed so as to cover an area that is 180° or more in the circumferential direction on a vertically upper side of the coil end portion.

13. The stator according to claim 5, wherein each of the heat releasing members that are connected to each of the phase windings are fixed to one another by a fixing member.

14. The stator according to claim 6, wherein each of the heat releasing members that are connected to each of the phase windings are fixed to one another by a fixing member.

15. The stator according to claim 7, wherein each of the heat releasing members that are connected to each of the phase windings are fixed to one another by a fixing member.

16. The stator according to claim 8, wherein each of the heat releasing members that are connected to each of the phase windings are fixed to one another by a fixing member.

17. The stator according to claim 9, wherein each of the heat releasing members that are connected to each of the phase windings are fixed to one another by a fixing member.

18. The stator according to claim 10, wherein each of the heat releasing members that are connected to each of the phase windings are fixed to one another by a fixing member.

19. The stator according to claim 11, wherein each of the heat releasing members that are connected to each of the phase windings are fixed to one another by a fixing member.

20. The stator according to claim 12, wherein each of the heat releasing members that are connected to each of the phase windings are fixed to one another by a fixing member.

\* \* \* \* \*